US012377621B2

(12) United States Patent
Lichtenberger et al.

(10) Patent No.: US 12,377,621 B2
(45) Date of Patent: Aug. 5, 2025

(54) METHOD FOR TREATING THE SURFACE OF MOULDED PARTS

(71) Applicant: DYEMANSION GMBH, Planegg (DE)

(72) Inventors: Niels Lichtenberger, Marberg (DE); Lukas Erdt, Munich (DE); Alena Folger, Kottgeisering (DE); Philipp Kramer, Munich (DE); Fabian Herz, Berg (DE)

(73) Assignee: DYEMANSION GMBH, Planegg (DE)

( * ) Notice: Subject to any disclaimer, the term of this patent is extended or adjusted under 35 U.S.C. 154(b) by 296 days.

(21) Appl. No.: 17/940,563

(22) Filed: Sep. 8, 2022

(65) Prior Publication Data

US 2023/0088219 A1 Mar. 23, 2023

Related U.S. Application Data

(63) Continuation of application No. PCT/EP2021/055775, filed on Mar. 8, 2021.

(30) Foreign Application Priority Data

Mar. 9, 2020 (DE) ............. 10 2020 106 373.3
Sep. 29, 2020 (DE) ............. 10 2020 125 414.8

(51) Int. Cl.
B29C 71/00 (2006.01)
B29C 64/30 (2017.01)
B33Y 40/20 (2020.01)
B33Y 80/00 (2015.01)

(52) U.S. Cl.
CPC .......... *B29C 71/0009* (2013.01); *B29C 64/30* (2017.08); *B33Y 40/20* (2020.01); *B33Y 80/00* (2014.12)

(58) Field of Classification Search
CPC ...... B29C 71/0009; B29C 64/30; B33Y 40/20
See application file for complete search history.

(56) References Cited

U.S. PATENT DOCUMENTS 12,023,880 B2 * 7/2024 Kramer .................. C08J 7/02
2016/0207263 A1 7/2016 Gordon
2019/0151886 A1 5/2019 Luo et al.
(Continued)

FOREIGN PATENT DOCUMENTS

DE 10 2018 121 915 B3 2/2020
EP 3 587 092 A1 1/2020
(Continued)

OTHER PUBLICATIONS

Notice of examination issued by the German Patent Office for German Patent Application No. 10 2020 125 414.8, dated Sep. 13, 2023, with English translation attached.
(Continued)

Primary Examiner — John J DeRusso
(74) Attorney, Agent, or Firm — Myers Wolin, LLC

(57) ABSTRACT

A method is for treating a surface of a molded part produced according to a 3D printing method using a plastics material. A solvent is selected from the group consisting of halogen-free and non-polar hydrocarbons and derivatives thereof and/or a solvent selected from the group consisting of bio-based solvents and is applied to the surface of the molded part. A device is for treating a surface according to the method described.

28 Claims, 9 Drawing Sheets

(56) References Cited

U.S. PATENT DOCUMENTS

| | | | |
|---|---|---|---|
| 2021/0197502 A1 | 7/2021 | Kramer et al. | |
| 2023/0166466 A1* | 6/2023 | Crabtree | ................. B29C 64/35 |
| | | | 264/341 |
| 2024/0198610 A1* | 6/2024 | Kramer | ................. B33Y 40/00 |

FOREIGN PATENT DOCUMENTS

| | | | |
|---|---|---|---|
| WO | 2016201614 A1 | 12/2016 | |
| WO | WO-2018183438 A1 * | 10/2018 | |
| WO | 2019/190902 A1 | 10/2019 | |
| WO | 2019203852 A1 | 10/2019 | |
| WO | 2021081507 A1 | 4/2021 | |
| WO | 2021180648 A1 | 9/2021 | |

OTHER PUBLICATIONS

International Search Report issued for International Patent Application No. PCT/EP2021/055775, mailed on Jun. 14, 2021.

* cited by examiner

METHOD FOR TREATING THE SURFACE OF MOULDED PARTS

CROSS REFERENCE TO RELATED APPLICATION

The present application is a continuation of International Application No. PCT/EP2021/055775, filed on Mar. 8, 2021, and claims priority of German Application No. 10 2020 106 373.3, filed on Mar. 9, 2020, and German Application No. 10 2020 125 414.8, filed Sep. 29, 2020, the contents of which are incorporated herein by reference.

FIELD OF THE INVENTION

The invention relates to a method for treating a surface of at least one molded part produced according to a 3D printing method, to a device for treating the surface of at least one molded part produced according to a 3D printing method, and also to a molded part produced by a method according to the invention or to a molded part, the surface of which has been treated using the method according to the invention.

BACKGROUND OF THE INVENTION

It is known to produce molded parts according to a 3D printing method. 3D printing methods are additive manufacturing methods in which a molded part is constructed in layers, in particular using a plastics material.

Such additive manufacturing methods have the disadvantage that the molded parts produced with them generally do not have a closed surface, i.e. have a production-related rough surface, which in many cases can negatively affect the haptic impression for the user of the molded part. In addition, a rough surface of such a molded part tends to become soiled relatively quickly, and cleaning the surface is only possible with considerable effort. In addition, the surface of such molded parts has a large number of pores due to the manufacturing process.

In order to smooth the surfaces of the molded parts produced according to a 3D printing method, the surfaces can be mechanically processed, for example abraded and/or blasted. The disadvantage in this case, however, is that there is an—albeit small—material removal from the surface of the molded part, which is usually above specified tolerance values to achieve the desired surface smoothness, so that the smoothing of the surface is accompanied by an undesirable change in the geometry of the molded part. In addition, when grinding, it is not possible to reach into small corners or small recesses that then remain unprocessed and are therefore not smoothed. In the case of flexible molded parts, such mechanical methods for smoothing the surface cannot be used or can only be used with great difficulty. In addition, regions of the surface that are extremely concave or have undercuts can only be mechanically smoothed with great effort or not at all. In the case of very filigree surface structures, there is also the risk that they will be damaged during grinding or blasting. Furthermore, pores present on the surface are only insufficiently closed even during grinding or blasting.

Another disadvantage of mechanical surface smoothing is that it is not suitable for series production.

In addition, there are options for chemical smoothing of the molded parts. For this purpose, the surface is partially dissolved using a solvent (for example hexafluoroisopropanol (HFIP), acetone, ethanol, benzyl alcohol, dichloromethane, formic acid or mixtures thereof). The dissolved surface then hardens again and a component with a smoothed surface is obtained. Many molded parts that are produced according to a 3D printing method are made of plastics materials with low polar surface energy, the surfaces of which cannot be smoothed with the solvents mentioned. Another disadvantage of the solvents mentioned is that they have low environmental compatibility. In particular, halogenated solvents are mostly bio-persistent and have a negative impact on human health. In addition, the production of these solvents is dependent on non-renewable raw materials.

OBJECT OF THE INVENTION

The object of the present invention is therefore to provide solutions which allow surfaces of molded parts produced according to a 3D printing method to be efficiently smoothed or homogenized in an eco-friendly manner without significant changes in the geometry of the molded parts and also in the case of flexible molded parts and can be used efficiently with molded parts that have surface portions that are difficult to machine mechanically.

Solution According to the Invention

This object is achieved according to the invention by a method for treating the surface of at least one molded part produced in a 3D printing method and by a device for treating the surface of at least one molded part produced in a 3D printing method according to the independent claims. Advantageous refinements and developments of the invention result from the respective dependent claims. 3D printing methods are purely additive manufacturing methods.

Provided is therefore a method for treating a surface of a molded part produced according to a 3D printing method using a plastics material, wherein a solvent selected from the group consisting of halogen-free and non-polar hydrocarbons and derivatives thereof and/or a solvent selected from the group consisting of bio-based solvents is applied to the surface of the molded part.

It is advantageous if the solvent is applied to the surface of the molded part in vaporous form.

The halogen-free and non-polar hydrocarbons according to the invention and derivatives thereof (derivatives of the halogen-free and non-polar hydrocarbons) are also collectively referred to below as halogen-free and non-polar hydrocarbon (derivative)s or as hydrocarbon (derivative)s. If hydrocarbons are mentioned below, then halogen-free and non-polar hydrocarbons and/or derivatives thereof are always meant.

According to the invention, solvents selected from the group consisting of halogen-free, non-polar, aliphatic and aromatic hydrocarbons and derivatives thereof can be used for treating the surface according to the invention.

Due to their low surface tension, the solvents mentioned allow homogeneous wetting of the surface of the molded part.

The solvent selected from the group consisting of halogen-free and non-polar hydrocarbons and derivatives thereof can be selected from the group comprising un-, mono- and polysubstituted benzenes (for example benzene, alkylbenzenes, in particular toluene, xylenes, monoethylbenzene, diethylbenzene, triethylbenzene, methylethylbenzene, diisooctyl phthalate, dimethylaniline, tetrahydronaphthalene), un-, mono- and polysubstituted open-chain alkanes (e.g., butane, pentane, hexane, heptane), un-, mono- and polysubstituted open-chain alkenes (e.g., butenes, pentenes, hexenes, heptenes), un-, mono- and polysubstituted cyclic, aliphatic hydrocarbons (e.g., cyclohexane, decaline, cubane, dicyclopentadiene, methylcyclohexane, limonene), carboxylic acid esters (e.g., butyl acetate, dioctyl adipate, acrylic acid ester, ethyl butyrate), un-, mono- and polysubstituted open-chain ethers (e.g., dimethyl ether, diethyl ether, diisopropyl ether, methyl isopropyl ether, diphenyl ether), un-, mono- and polysubstituted cyclic ethers (e.g., tetrahydrofuran (THF), dioxane, furfural), un-, mono- and polysubstituted ketones (e.g., biisobutyl ketone) and combinations or mixtures thereof.

Halogen-free, non-polar solvents have the advantage that they are usually not harmful to health, not toxic and not hazardous to water and/or air. However, some of them have an increased flammability.

The method according to the invention, which is preferably carried out under reduced pressure, makes it possible to use non-polar, halogen-free, flammable solvents.

Solvents which have a flash point above 40° C. have proven to be advantageous. Solvents having a flash point above 52° C. are particularly advantageous. However, the invention is not restricted to these solvents, since an explosion can also be prevented by an inert environment, e.g., nitrogen.

From the point of view of flammability, the following solvents have proven to be advantageous:

o-, m-, p-diethylbenzene, trimethylbenzene, triethylbenzene, ethyltoluene, decalin, tetrahydronaphthalene, diphenyl ether, ethyl butyrate, furfural and limonene.

Among these solvents, the following are particularly advantageous, taking into account the health hazards of these substances:

o-, m-, p-diethylbenzene, hemellitol (1,2,3-trimethylbenzene), 1,2,4-triethylbenzene, 1,3,5-triethylbenzene, diphenyl ether, ethyl butyrate and limonene.

The bio-based solvents according to the invention can either be natural substances (organic compounds formed by organisms) or synthesized from them. According to the invention, these substances can include bio-based substances which are liquid or solid at room temperature and are suitable for dissolving plastics materials. All of these substances are referred to below as bio-based solvents.

According to the invention, the bio-based solvents also comprise synthetically produced chemical compounds, provided these can be obtained from starting compounds which are natural substances or bio-based compounds. It is irrelevant for the method according to the invention whether the natural substance is actually obtained naturally or is also produced synthetically.

The solvents according to the invention can usually be obtained efficiently from biomass, in particular from residues containing cellulose and hemicellulose, such as wood waste or food plant residues (e.g., corn, orange peel). Bio-based solvents are often "green solvents" that are not harmful to health or the environment, but still meet the application needs for efficient surface smoothing of molded parts produced according to a 3D printing method. The method according to the invention also allows the surfaces of molded parts produced according to a 3D printing method to be treated in a sustainable manner.

The bio-based solvent can be selected from the group comprising terpenes and terpenoids, alkylphenols and derivatives thereof, cyclic and acyclic carbonate esters, furan-based ethers, ketocarboxylic acids, carboxylic acid ester, lactones and combinations or mixtures thereof.

Bio-based solvents have the advantage that they can be obtained from natural raw materials. In addition, they are usually not harmful to health, not toxic and not hazardous to water and/or air. However, compared to synthetic halogenated solvents, some of them are more flammable.

Flammable, bio-based solvents can also be used according to the method according to the invention, which is preferably carried out in a low-oxygen atmosphere (negative pressure, protective gas). Bio-based solvents which have a flash point above 30° C. have proven to be advantageous. Solvents having a flash point above 42° C. are particularly advantageous. However, the invention is not restricted to these solvents, since an explosion can also be prevented by an inert environment (e.g., nitrogen atmosphere) or by a nonsparking operation.

From the point of view of flammability, the following solvents have proven to be advantageous: 1,8-cineole, diethyl succinate, δ-decalactone, levulinic acid, limonene, methyl isohexenyl ketone, γ-terpinene, thymol.

When using natural substances, it has proven particularly advantageous to add additives to the bio-based solvent used to treat the surface or to smooth the molded part. Antioxidants, heat stabilizers and polymerization inhibitors in particular have proven to be advantageous additives, since natural substances are usually not permanently heat-stable and tend to oxidize when they come into contact with (atmospheric) oxygen. This has the advantage that the natural substances used as solvents can be used for a long time and a stable, reproducible surface treatment of molded parts is ensured. The addition of additives has also proven advantageous for other bio-based solvents that are not natural substances.

Additives can be selected from the group comprising sterically hindered phenolic compounds, sterically hindered amines (HALS), phosphites, phosphonites and combinations or mixtures thereof.

The additives can be added to the solvent in concentrations between 5 ppm and 4000 ppm based on the solvent-additive mixture.

It can be advantageous if the additives have a boiling point and a decomposition temperature which are at least 30° C., particularly preferably at least 50° C., above the boiling point of the natural substance used for the surface treatment.

The plastics material of the molded part is selected from the group comprising thermoplastics and light-curing plastics materials, from the group comprising pure polymers, copolymers and mixtures thereof, preferably selected from the group comprising polyesters, polyamides, polyurethanes, polyketones, polyimides, polyimines, polysulfides, polysulfones, polyolefins, polycarbonates, polyacrylonitriles, polyphthalates, polythioethers, rubbers, latex, polyacrylates, cyanate esters and combinations or mixtures thereof, particularly preferably selected from the group comprising polyolefins, polyketones, polystyrenes, polycarbonates, polysulfones and combinations or mixtures thereof.

According to the invention, non-polar, halogen-free solvents are particularly suitable for non-polar plastics materials such as polyolefins (e.g., polypropylene, polyethylene, polymethylpentene, polybutylene), polyketones (e.g., polyethyl ether ketones, polyaryl ether ketones, polyether ketone ketones), polystyrenes, polycarbonates and/or polysulfones. It has been shown that these plastics materials cannot be smoothed sufficiently with polar solvents.

Furthermore, for non-polar plastics materials such as polyolefins (e.g., polypropylene, polyethylene, polymethylpentene, polybutylene) and/or polystyrenes, bio-based solvents that are non-polar according to the invention or readily miscible with non-polar solvents such as ether or chloroform are particularly well suited. It has been shown that these plastics materials cannot be sufficiently smoothed with polar, bio-based solvents. For the purposes of the invention, all bio-based compounds that are particularly suitable for these plastics materials can be classified under the collective designation of lipids. These are bio-based substances that are poorly or not at all soluble in water.

When using bio-based solvents, it is important to control the process of surface treatment of molded parts very precisely. This can prevent the usually not so stable compounds from decomposing. At the same time, the process window for a suitable processing temperature is very small. The latter is due to the lower aggressiveness of the bio-based solvents. In addition, smoothing molded parts with solvent steam results in more homogeneous results than smoothing with liquid solvent steam. In order to achieve a homogeneous smoothing of surfaces of a molded part produced according to a 3D printing method with a bio-based solvent despite these limitations, precise process control is advantageous or necessary.

It is advantageous if, according to the method,
(a) the molded part is introduced into an interior of a preferably pressure-tight container,
(b) a negative pressure, preferably an extensive vacuum, is generated in the interior of the container after introducing the molded part into the container,
(c) the solvent is heated up to a specified solvent temperature and
(d) the heated solvent is introduced from a solvent container into the interior under negative pressure after introducing the molded part into the interior of the container,
wherein
the temperature of the molded part is lower than the solvent temperature and
the solvent is evaporated into the interior or is introduced as a steam into the interior upon being introduced, said solvent steam condensing on the surface of the molded part.

It is advantageous if a negative pressure of less than 10 mbar is generated in the interior of the container after introducing the molded part into the container.

Due to the negative pressure or the extensive vacuum in the interior of the container, it is ensured that the solvent enters the interior in vaporous form and, due to the lower temperature of the molded part, condenses on the surface thereof. With the help of the temperature difference between the molded part and the solvent steam and the duration of the solvent supply and possibly the pressure difference between the solvent container and the interior of the pressure-tight container, the solvent condensate that forms on the surface of the molded part can be controlled very precisely, which in turn allows the degree of dissolution of the surface to be controlled. This cannot be achieved with a solvent bath in which the molded part to be treated is placed.

It can be advantageous if the interior of the pressure-tight container is brought to a specified first internal temperature before step (a) or after step (a). For this purpose, a temperature sensor can be arranged in the interior of the pressure-tight container.

By introducing the solvent into the interior (step (d)), the temperature of the interior can be brought to a specified second internal temperature, which can be lower or higher than the specified first internal temperature, wherein the solvent is introduced into the interior
as long as the solvent is introduced into the interior until a specified second internal temperature is reached or
over a specified period of time, preferably over a period of time of between 1 s and 600 s, particularly preferably over a period of time of between 5 s and 300 s, wherein the specified second internal temperature is reached after the specified period of time.

The first internal temperature and the second internal temperature can be the same.

The second internal temperature can therefore be higher, just as high or lower than the first internal temperature. A lowering of the temperature can be caused by the natural cooling of the chamber or the evaporative cooling, and it can be allowed actively by a cooling unit.

It can be advantageous if, after introducing the molded part into the interior (step (a)) and before introducing the solvent into the interior (step (d)), the temperature of the interior is brought to a third internal temperature.

The third internal temperature can be lower than the specified second internal temperature, whereby the molded part is brought to a part temperature which is lower than the specified second internal temperature. In one embodiment of the method, the part temperature can be the same as the third internal temperature.

In one embodiment of the invention,
(e) after introducing the solvent into the interior, the molded part can be dried.

It is advantageous if the molded part is dried, in particular vacuum-dried, in the interior having the negative pressure.

It can be advantageous if the molded part is dried in the interior, wherein a negative pressure, preferably an extensive vacuum, is generated to dry the molded part in the interior, wherein the generation of the negative pressure is interrupted at least once in that a transport gas is supplied into the interior. After supplying the transport gas, the generation of the negative pressure can be continued. This procedure can be repeated multiple times.

It can be advantageous in this case if the transport gas is supplied to the interior when the pressure in the interior is less than 50 mbar, the pressure in the interior being increased to a value of between 50 mbar and 100 mbar by supplying the transport gas. After a pressure between 50 mbar and 100 mbar has been reached, the generation of the negative pressure can be continued until the internal pressure is again less than 50 mbar. This procedure can be repeated multiple times.

According to an advantageous embodiment of the method, steps (d) and (e) can be repeated multiple times.

It has proven to be advantageous if defined holding times are observed after steps (d) and/or (e). This can involve holding times of between 0.5 s and 600 s, preferably holding times of 1 s to 180 s. The holding times according to step (d) and (e) can, but do not have to, be identical.

In a special embodiment of the invention, the duration of the hold time increases or decreases with each repetition.

It is particularly advantageous here if
after step (d), a holding time (H) is provided during which the molded part is located in the interior of the pressure-tight container in an environment that occurs immediately after the introduction of the solvent or the solvent steam into the interior of the pressure-tight container and/or
after step (e), a holding time (H) is provided during which the molded part is located in the interior of the pressure-tight container in an environment that occurs immediately after the drying or immediately after the suctioning off of the solvent or the solvent steam from the interior of the pressure-tight container.

The provision of holding times has the advantage that the smoothing effect can be increased. At the same time, the drying is intensified by a holding time in a hot vacuum (after step (e)). This results in the advantage of even lower solvent residues on the molded part at the end of the method. It may be advantageous not to provide the holding times after each step (d) or (e) when steps (d) and (e) are repeated, but only after the first execution of step (d) and/or (e).

Due to the negative pressure or the extensive vacuum in the interior of the container, it is ensured that the solvent enters the interior in vaporous form and, due to the lower temperature of the molded part, condenses on the surface thereof. With the help of the temperature difference between the molded part and the solvent steam and the duration of the solvent supply and possibly the pressure difference between the solvent container and the interior of the pressure-tight container, the solvent condensate that forms on the surface of the molded part can be controlled very precisely, which in turn allows the degree of dissolution of the surface to be controlled.

In an advantageous embodiment of the invention, circulation takes place during the holding times. This makes the smoothing result even more reproducible and homogeneous.

It can be advantageous in this case if during a repetition
in step (d), the temperature of the interior is brought to a second internal temperature which is higher than the second internal temperature in the previous execution of step (d) or
in step (d), the temperature of the interior is brought to a second internal temperature which is lower than the second internal temperature in the previous execution of step (d) or
in step (d), the temperature of the interior is brought to a second internal temperature which is equal to the second internal temperature in the previous execution of step (d).

During a repetition, before step (d) is executed, the temperature of the interior can be brought to a temperature which is lower or higher than the second internal temperature in the previous execution of step (d).

It can be advantageous if the temperature of the solvent is reduced after each repetition.

After step (d), the solvent evaporated in the interior and/or the solvent condensed on the inner wall of the interior can be suctioned off.

The suctioned-off solvent can be processed, in particular cleaned and distilled, and the processed solvent is returned to the solvent container. In a particularly advantageous embodiment of the invention, this results in a method in which a solvent is used which can be used as often as desired in the cycle without impairing the quality of the smoothing result, without solvent waste or other products requiring disposal.

According to the invention, the negative pressure in the interior, the solvent temperature, and the internal temperatures can be coordinated so that the solvent evaporates in the interior upon being introduced into the interior or enters the interior as solvent steam.

The pressure difference between the solvent container and the interior of the pressure-tight container can result in turbulence in the interior, which allows the solvent to be homogeneously distributed around the component, in particular in the region of undercuts, cavities, tubes and blind holes. This ensures a homogeneous smoothing even on difficult-to-access surface regions.

A turbulence device can be provided to cause a turbulence in the solvent steam that is introduced in the interior.

It has been found to be advantageous if the introduced molded part is moved, in particular rotated, in steps (d) and/or (e). This prevents the formation of drops or runs on the surface of the molded part.

Moving the molded part or causing a turbulence in the solvent steam with a turbulence device can also be advantageous during the holding times after steps (d) and/or (e).

Optionally, the surface of the molded part can be mechanically processed, in particular ground or blasted, before introducing into the interior.

It is optional, but nevertheless advantageous, if
the molded part is colored before step (a) or after step (d) or (e) and/or
the molded part is freed from residual powder before step (a), provided that the molded part was printed in a powder-based method and/or
the molded part is matted after step (d) or (e), in particular by means of blasting the surface, and/or is ground, and/or
the molded part is impregnated and/or painted after step (d) or (e) and/or
the surface of the molded part is compacted before step (a) or after step (d) or (e), in particular by means of blasting the surface with plastics material balls and/or
the molded part is baked in an oven or a vacuum oven after step (d) or (e) and/or
the molded part is cleaned in a cleaning bath at a specified temperature before step (a) or after step (d) or (e) and/or
the surface of the molded part is smoothed before step (a) or after step (d) or (e), in particular by means of grinding.

According to the invention, the optional pre- and post-treatment steps can be combined in any order.

The molded part can be heated before step (a). This is particularly advantageous for materials that tend to absorb water, as they otherwise tend to form additional bubbles during the smoothing process due to the evaporation of the bound water (at high temperatures and/or under negative pressure).

In addition, it is particularly advantageous if the solvent is a distillable solvent. All particularly advantageous solvents according to the invention also meet this requirement.

In a particular embodiment of the invention, the solvent can be present as a solid at room temperature. In this case, the invention provides for permanent heating of the solvent to a temperature above the melting point of the corresponding solvent. Continuous heating can also be advantageous when the solvent is mixed with additives that are solid at room temperature.

The method according to the invention has proven to be particularly advantageous for molded parts that have been produced in powder-based or filament-based 3D printing methods. In this method, individual layers are fused together in a layer construction method. The method according to the invention is particularly advantageous for molded parts which are produced using the SLS (selective laser sintering) method, the MJF (MultiJet Fusion) method or the HSS (high-speed sintering) method, the FFF (fast filament fabrication) method, the FDM (fused deposition molding) method or by means of the STEP (selective thermographic electropholographic process) method.

It is advantageous if a plurality of liters of solvent, preferably at least 20 liters of solvent, are heated to the specified solvent temperature.

It can be advantageous if the solvent is heated to the specified solvent temperature which is above 50° C.

The solvent container can be designed to be pressure-tight, wherein a negative pressure is generated in the interior of the solvent container before introducing the solvent from the solvent container into the interior of the pressure-tight container.

It can be advantageous in this case if an extensive vacuum is generated in the interior of the solvent container.

It is particularly advantageous if the pressure in the interior of the pressure-tight container is lower than the pressure in the interior of the solvent container.

In one embodiment of the invention, it can be advantageous if the pressure difference between the interior of the pressure-tight container and the interior of the solvent container is selected so that a turbulence in the solvent introduced into the interior of the pressure-tight container is caused due to the pressure difference.

It has proven to be advantageous if a food-safe solvent or a solvent approved for processing plastics material for food is used as a solvent.

Furthermore, a device is provided for treating a surface, in particular according to the method according to the invention, of at least one molded part produced according to a 3D printing method, the device having
  a pressure-tight container having an interior in which the molded parts to be treated are received,
  a solvent container for holding a solvent and
  a vacuum pump,
  wherein
  the first solvent container is coupled to the pressure-tight container via a supply line in order to supply the solvent from the first solvent container to the pressure-tight container and
  the vacuum pump is coupled to the pressure-tight container in order to generate a negative pressure, preferably an extensive vacuum, in the pressure-tight container.

The device may comprise a second solvent container, wherein the first solvent container is coupled to the second solvent container. The second solvent container is to intended to hold a bio-based solvent or a mixture of bio-based solvent and additives.

In one embodiment of the invention, the second solvent container is coupled to the first solvent container via a valve.

It can be advantageous if the valve can be regulated.

In one embodiment of the invention, the valve is controlled by sensors installed in the device. If there are deviations from defined target values on specific sensors (e.g., temperature-pressure relationship in the solvent container, photospectrometrically detected color changes in the solvent), solvent can be supplied from the second solvent container to the first solvent container in a controlled manner via the valve.

It can be advantageous if the solvent container has a heating device in order to heat the solvent received in the solvent container.

Furthermore, it can be advantageous if the pressure-tight container has a heating device in order to heat the interior and/or the molded parts received in the interior.

In one embodiment of the invention, the solvent container can be designed to be pressure-tight.

In one embodiment of the invention, a vacuum pump is coupled to the solvent container in order to generate a negative pressure, preferably an extensive vacuum, in the solvent container.

It can be advantageous if a temperature sensor and/or a pressure sensor is assigned to the solvent container and/or the pressure-tight container.

It can be advantageous if the solvent container is connected to the pressure-tight container via a controllable valve. This has the advantage that the flow of the solvent or the solvent steam can be controlled very precisely. In this way, in particular, the quantity and feed rate of the solvent can be controlled depending on the material of the molded part and the solvent used.

It is advantageous if the interior of the pressure-tight container is assigned a turbulence device with which a turbulence in the solvent steam introduced into the interior can be caused.

The device can have an open or closed loop controller with which
  the heating device of the pressure-tight container and the vacuum pump can be regulated and/or controlled in order to set the pressure and the temperature in the interior of the pressure-tight container and
  the heating device of the solvent container can be regulated and/or controlled in order to set the temperature of the solvent.

The pressure-tight container can be coupled to a suction device in order to suction out solvent steam and/or solvent condensate present in the pressure-tight container.

The suction device can be coupled to the solvent container via a return line in order to return the suctioned-off solvent steam and/or the suctioned-off solvent condensate to the solvent container.

The device can have a cleaning and/or distilling device which is adapted to clean and/or distill the suctioned-off solvent steam and/or the suctioned-off solvent condensate.

According to one embodiment of the invention, the device can have at least one further solvent container which is coupled to the pressure-tight container via at least one further supply line to supply at least one further solvent from the at least one further solvent container to the pressure-tight container. Different solvents can thus be used for the treatment of the surface, for example a first solvent in a first treatment cycle and a second solvent in a second treatment cycle.

The solvent container can be pressure-tight.

A molded part made of non-polar plastics material is also provided, which has been produced according to a 3D printing method and the surface of which has been treated by the method according to the invention.

Also provided is a further method for treating a surface of a molded part produced according to a 3D printing method using a plastics material, wherein a solvent is selected from the group comprising myrcene (7-methyl-3-methylene-1,6-octadiene), ocimene (3,7-dimethyl-1,3,6-octatriene), cosmene, linalool, nerol, lavandulol, β-phellandrene, α-phellandrene, D-limonene, L-limonene, dipentene (racemic mixture), α-terpinene, γ-terpinene, terpinene (mixture of substances), pinene (α-pinene, β-pinene and δ-pinene), isobornylan, isocamphane, bornane, δ-terpinene (terpinolene), sabinene, α-thujene, β-thujene, carane, carene (3-carene, 2-carene), fenchan, α-fenchen, β-fenchen, cis-(+)-limonene-1,2-oxide, trans-(+)-limonene-1,2-oxide, limonene-1,2:8,9-dioxide (mixture), thymol, α-pinene oxide, β-pinene oxide, D-camphor, L-camphor, carvone, nopionone, norcamphor, citronellal, menthol, isopulegol, carvacrol, borneols, geraniol, lavandulol, p-menth-1-en-8-thiol and combinations thereof.

The other method steps and additives mentioned above can also be applied or used in this other method.

Finally, the use of a solvent selected from the group consisting of bio-based solvent for treating a surface of a molded part produced according to a 3D printing method using a plastics material is provided, wherein the solvent is applied to the surface of the molded part.

When using the bio-based solvent according to the invention, this can be applied in vaporous form to the surface of the molded part. In an alternative embodiment of the invention, the bio-based solvent can be applied in liquid form to the surface of the molded part.

When using the bio-based solvent according to the invention, this can either be a natural product (organic compounds formed by organisms) or synthesized from natural products.

When using the bio-based solvent according to the invention, this can also comprise synthetically produced chemical compounds, provided these can be obtained from starting compounds which are natural substances or bio-based compounds.

When using the bio-based solvent according to the invention, this can be selected from the group comprising
  terpenes and terpenoids,
  alkylphenols and derivatives thereof,
  cyclic and acyclic carbonate esters,
  furan-based ethers,
  ketocarboxylic acids,
  carboxylic acid ester,
  lactones and
  combinations or mixtures thereof.

When using the bio-based solvent according to the invention, the following solvents have proven to be advantageous: 1,8-cineole, diethyl succinate, δ-decalactone, levulinic acid, limonene, methyl isohexenyl ketone, γ-terpinene, thymol.

When using the bio-based solvent according to the invention, it has proven to be particularly advantageous to add additives to the bio-based solvent, in particular antioxidants, heat stabilizers and polymerization inhibitors. The additives can be selected from the group comprising
  sterically hindered phenolic compounds,
  sterically hindered amines (HALS),
  phosphites,
  phosphonites and
  combinations or mixtures thereof.

When using the bio-based solvent according to the invention, the additives can be added to the solvent in concentrations between 5 ppm and 4000 ppm based on the solvent-additive mixture, wherein it can preferably be advantageous if the additives have a boiling point and a decomposition temperature which are at least 30° C., particularly preferably at least 50° C., above the boiling point of the natural substance used for the surface treatment.

When using the bio-based solvent according to the invention, the plastics material of the molded part can be selected from the group comprising thermoplastics and light-curing plastics materials or from the group comprising pure polymers, copolymers and mixtures thereof, preferably selected from the group comprising polyesters, polyamides, polyurethanes, polyketones, polyimides, polyimines, polysulfides, polysulfones, polyolefins, polycarbonates, polyacrylonitriles, polyphthalates, polythioethers, rubbers, latex, polyacrylates, cyanate esters and combinations or mixtures thereof.

When using the bio-based solvent according to the invention, it is advantageous if
  (a) the molded part is introduced into an interior of a preferably pressure-tight container,
  (b) a negative pressure, preferably an extensive vacuum, is generated in the interior of the container after introducing the molded part into the container,
  (c) the solvent is heated up to a specified solvent temperature and
  (d) the heated solvent is introduced from a solvent container into the interior under negative pressure after introducing the molded part into the interior of the container,
  wherein
  the temperature of the molded part is lower than the solvent temperature and
  the solvent is evaporated into the interior or is introduced as a steam into the interior upon being introduced, said solvent steam condensing on the surface of the molded part.

When using the bio-based solvent according to the invention,
  (e) after introducing the solvent into the interior, the molded part can be dried after a specified period of time.

When using the bio-based solvent according to the invention, it can be advantageous if the molded part is dried, in particular vacuum-dried, in the interior having the negative pressure.

When using the bio-based solvent according to the invention, steps (d) and (e) can be repeated multiple times.

When using the bio-based solvent according to the invention, it can be advantageous if a holding time (H) is provided after step (d) and/or after step (e).

It can be particularly advantageous when using the bio-based solvent according to the invention if
  after step (d), a holding time (H) is provided during which the molded part is located in the interior of the pressure-tight container in an environment that occurs immediately after the introduction of the solvent or the solvent steam into the interior of the pressure-tight container and/or
  after step (e), a holding time (H) is provided during which the molded part is located in the interior of the pressure-tight container in an environment that occurs immediately after the drying or immediately after the suctioning off of the solvent or the solvent steam from the interior of the pressure-tight container.

When using the bio-based solvent according to the invention, the holding times are preferably between 0.5 s and 600 s, particularly preferably between 1 s and 60 s. The holding times after steps (d) and/or (e) can, but do not have to, be identical.

When using the bio-based solvent according to the invention, it has proven advantageous if
  the molded part is colored before step (a) or after step (d) or (e) and/or the molded part is freed from residual powder before step (a), provided that the molded part was printed in a powder-based method and/or the molded part is matted after step (d) or (e), in particular by means of blasting the surface, and/or is ground, and/or the molded part is impregnated and/or painted after step (d) or (e) and/or the surface of the molded part is compacted before step (a) or after step (d) or (e), in particular by means of blasting the surface with plastics material balls and/or the molded part is heated in an oven or a vacuum oven after step (d) or (e) and/or the molded part is cleaned in a cleaning bath at a specified temperature before step (a) or after step (d) or (e) and/or the surface of the molded part is smoothed before step (a) or after step (d) or (e), in particular by means of grinding.

When using the bio-based solvent according to the invention, it can be advantageous if the molded part is heated before step (a).

When using the bio-based solvent according to the invention, it can be advantageous if the solvent is a distillable solvent. Bio-based solvents having a boiling point between 50° C. and 250° C. have proven to be particularly advantageous for this purpose.

The use of the bio-based solvent according to the invention has proven to be particularly advantageous for molded parts that have been produced in powder-based or filament-based 3D printing methods, in particular using the SLS (selective laser sintering) method, the MJF (MultiJet Fusion) method or the HSS (high-speed sintering) method, the FFF (fast filament fabrication) method, the FDM (fused deposition molding) method or the STEP (selective toner electrophotographic process) method.

BRIEF DESCRIPTION OF THE FIGURES

Further details and features of the invention will become apparent from the following description taken in conjunction with the drawing, in which.

DETAILED DESCRIPTION OF THE INVENTION

Where "solvent" is mentioned below, the solvents mentioned above are always meant.

Figure 1A:
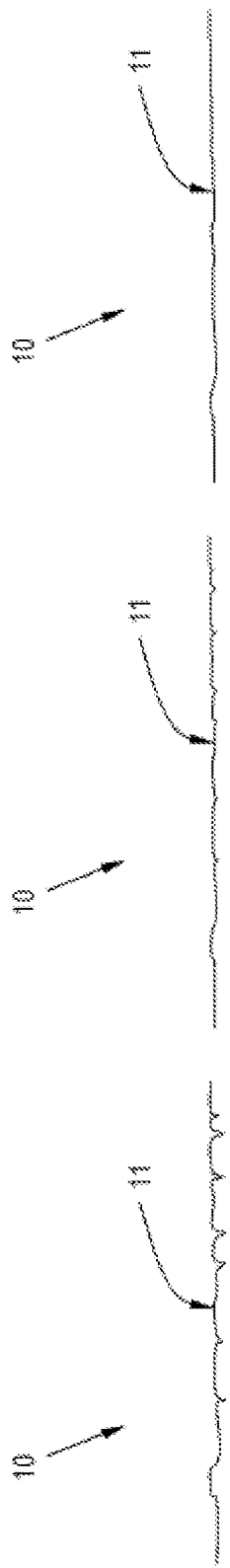
FIGS. 1A-1C are enlarged illustrations of a section of a surface of a molded part produced according to a 3D printing method, which surface is smoothed according to the method according to the invention.
Figure 1B:
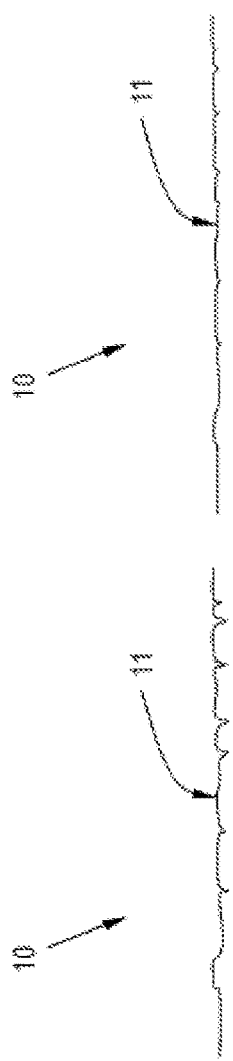
Figure 1C:
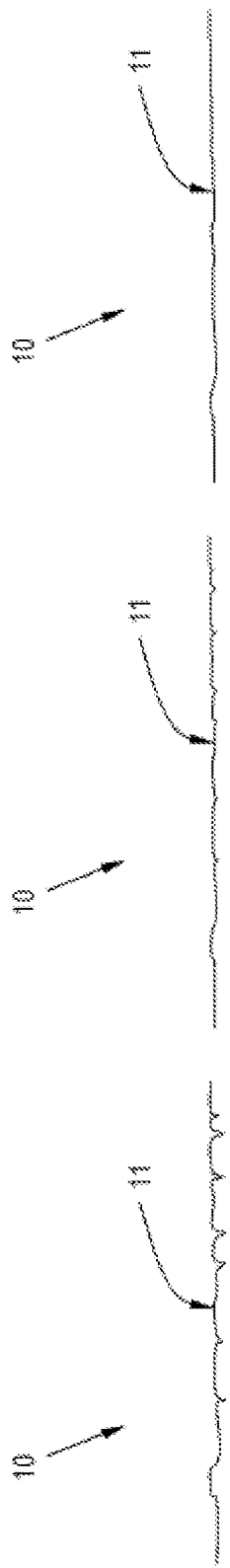

FIGS. 1A-1C show an enlarged section of a surface 11 of a molded part 10 produced according to a 3D printing method in FIG. 1A. A powder-based printing method was used in this case to produce the molded part 10. The surface 11 of the molded part 10 has manufacturing-related unevenness, in particular pores, which promote the adhesion of dirt or impurities to the surface 11 of the molded part 10. The rough or porous surface 11 of the molded part 10 also has a negative effect on the feel of the molded part 10. The surface shown in FIG. 1A has not yet been processed with the method according to the invention.

According to the invention, the surface 11 of the molded part 10 is smoothed in order to eliminate or close the unevenness, in particular the pores. For this purpose, a solvent in the form of solvent steam is applied to the surface 11 of the molded part 10 and condenses on the surface of the molded part. The molded part is then dried. After the solvent steam has been applied or after the solvent steam has condensed on the surface, it can be advantageous to provide a specified holding time before the drying process is initiated. This holding time allows an even better smoothing effect to be achieved. It can also be advantageous to provide a holding time after the drying process, whereby solvent residues on the molded part can be further reduced. Holding times are optional but have proven advantageous.

The method according to the invention for treating the surface is described in detail with reference to FIGS. 2 to 7.

The treatment of the surface 11 can comprise a plurality of cycles, with solvent, i.e. solvent steam, being applied to the surface of the molded part in each cycle and the molded part 10 being subsequently dried. Depending on the material used, which was used to produce the molded part according to the 3D printing method, and depending on the requirement for the smoothness of the surface to be achieved, a single cycle may be sufficient. However, multiple cycles are advantageous. In each cycle, the above-mentioned holding times can be provided after the application of the solvent steam and/or after the drying process, with the holding times here also being optional.

FIG. 1B shows the surface 11 of the molded part 10 after a first treatment cycle in which solvent was applied to the surface 11 in the form of solvent steam and was then dried. It can be clearly seen in this case that the surface 11 is significantly smoother than the surface shown in FIG. 1A; in particular it has almost no pores.

In order to bring about an even further smoothing of the surface, a further processing cycle can be carried out in which again solvent in the form of solvent steam is applied to the surface 11 of the molded part 10 and the molded part 10 is then dried.

FIG. 1C shows the surface 11 of the molded part 10 after the second treatment cycle. It can be seen here that the surface 11 has been smoothed even further compared to the surface shown in FIG. 1B. It can also be seen that the smoothing method led to almost no change in the geometry of the molded part. In contrast to the mechanical surface treatment, there is almost no material removal in this case, since the surface of the molded parts is only slightly dissolved with the solvent applied to the surface 11, whereby unevenness is eliminated. A significant advantage, however, is that pores present on the surface are closed.

The molded parts treated in this way have a particularly high level of surface smoothness, so that in many cases there is no need to impregnate the surface.

In one embodiment according to the invention, it may be advantageous to bring the solvent not in vaporous form but rather in liquid form into contact with the molded parts. It is advantageous here that the entire surface of the molded part can be brought into contact with the same amount of bio-based solvent, whereby a homogeneous smoothing result can be achieved. As a result, a stronger smoothing of the surface can already be achieved in the first iteration. Furthermore, an immersion method that is not dependent on the condensation of the solvent is not as temperature-sensitive, which minimizes the influence of the heat capacity of the molded part to be smoothed and more homogeneous results can be achieved with highly varying molded part thicknesses. Another advantage of such an embodiment is that the method can be carried out at lower temperatures and/or higher pressures. This can result in simplifications in terms of process technology, for example due to the omission of solvents in different aggregate states.

Figure 2:
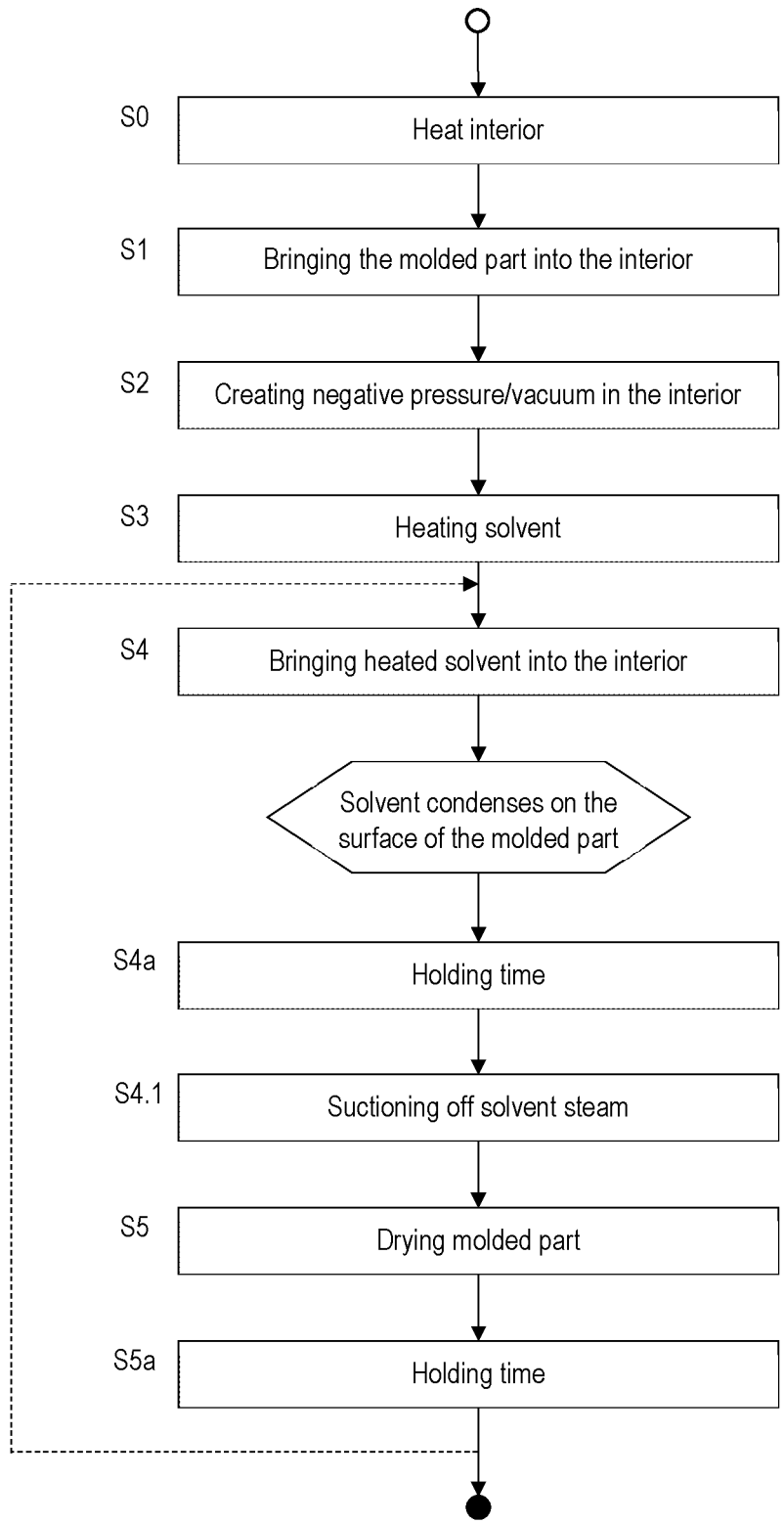
FIG. 2 is a flow chart to illustrate the method according to the invention.

FIG. 2 shows a flow chart according to an embodiment of the method according to the invention.

To carry out the method, a device is provided which has a pressure-tight container having an interior in which the surface of the molded part is treated, and a container which contains a solvent. These two containers are connected to one another via a line, the supply of solvent into the container in which the molded part is being treated being controlled via a valve. The container in which the molded part is treated is designed to be pressure-tight. The container that contains the solvent is preferably also designed to be pressure-tight.

The molded part produced according to a 3D printing method is introduced into the interior of the pressure-tight container in step S1.

Before introducing the molded part into the pressure-tight container, the molded part can be heated to a specific temperature, for example to between 50 and 150° C., preferably to about 90° C. and 120° C. How far the molded part can be heated depends substantially on the material or plastics material used with which the molded part is produced in the 3D printing method. As a result, depending on the material used, the molded part can be heated to over 150° C. or even to a temperature below 50° C. The maximum temperature to which the molded part can be heated must always be set so that the molded part does not deform due to the temperature. In addition, the maximum temperature to which the molded part is heated must be set so that the temperature of the molded part can rise further in the subsequent processing process due to the solvent steam flowing into the interior of the pressure-tight container without resulting in deformation of the molded part.

Furthermore, care must be taken to ensure that the preheating temperature is selected in such a way that the molded part does not oxidize heavily due to heat and atmospheric oxygen. In order to still allow heating at high temperatures, the molded part can alternatively be heated in a low-oxygen atmosphere (e.g., inert gas or vacuum).

As an alternative to heating the molded part before introducing it into the pressure-tight container, the molded part can also be heated after introducing it into the pressure-tight container, i.e. be heated in the pressure-tight container.

For this purpose, in a step S0, which is executed before step S1, the interior of the pressure-tight container can be heated to a specified temperature, for example 130° C. The interior of the pressure-tight container can be heated with a heating device, for example by means of heating jackets. The heating can be controlled by means of a temperature sensor which is arranged in the interior of the pressure-tight container.

After the interior has reached the specified temperature, the molded part can be introduced into the interior of the pressure-tight container (step S1). The molded part introduced is heated to a specific temperature, the internal temperature of the interior cooling down somewhat at the same time, since the molded part absorbs a specific amount of heat energy when it is heated or the pressure-tight container releases heat to the environment. For example, the interior of the pressure-tight container can cool down to approximately 108° C. and the molded part heats up to approximately 108° C., preferably to a maximum of 108° C.

With the aid of the heating device, it can be ensured, if necessary, that the internal temperature does not drop below a specific temperature or does not drop at all after the molded part has been introduced into the interior. If the interior is heated to 130° C., for example, it can be ensured that the temperature of the interior remains at approximately 130° C. or does not drop below, for example, 108° C. after introducing the molded part.

Alternatively, step S0 can also be executed after step S1. This means that, after the molded part has been introduced into the interior of the pressure-tight container, the interior of the pressure-tight container is heated, for example to about 108° C. This also heats the molded part to about 108° C.

After introducing the molded part, a negative pressure, preferably an extensive vacuum, is generated in the interior of the pressure-tight container (step S2). In this context, negative pressure means a pressure below atmospheric pressure. In connection with the present invention, "vacuum" is understood to mean a pressure below 300 mbar.

It is advantageous if the negative pressure or vacuum is generated in the interior of the pressure-tight container immediately after introducing the molded part into the interior in order to prevent the molded parts from yellowing or otherwise being discolored during heating. It has been shown that the molded parts can be prevented from yellowing when the molded parts are heated if they are not exposed to any or virtually no oxygen. Accordingly, it is advantageous to generate a negative pressure or a vacuum in the pressure-tight container immediately after introducing the molded part into the pressure-tight container, regardless of whether step S0 is executed before step S1 or after step S1.

In a step S3, the solvent stored in the solvent container is heated to a specified solvent temperature, for example to 130° C. The solvent container is preferably designed to be pressure-tight.

It has been found to be particularly advantageous if the amount of heated solvent is a plurality of liters, preferably at least 20 liters. This ensures that sufficient solvent is available at a suitable temperature for the process. This allows for a particularly stable and thus reproducible process, which can also be carried out independently of the number of molded parts to be processed or their surface, without this having any influence on the smoothing result.

The solvent in the solvent container can be heated, for example, by means of a sleeve or jacket heater or directly via heating elements in each case.

For many applications, a solvent temperature of over 100° C. has proven to be particularly advantageous, as this ensures that there is a sufficient temperature difference between the parts to be smoothed and the solvent steam throughout the entire process. This ensures the condensation of the solvent on the surface. At the same time, an increased temperature of the solvent is crucial for the temperature of the solvent condensate, which in turn has a decisive influence on the solubility of the solvent and thus the smoothing result.

Step S3 can be executed before steps S0 to S2 or in parallel with steps S0 to S2, it only being necessary to ensure that the solvent has reached the specified solvent temperature before carrying out step S4. This can be checked with the aid of a temperature sensor in the, preferably pressure-tight, solvent container.

After the solvent has reached the specified solvent temperature and the interior of the pressure-tight container or the molded part introduced into the interior has reached the desired temperature, the heated solvent is introduced into the interior of the pressure-tight container under negative pressure in step S4. This can be done, for example, by opening a valve which separates the interior of the pressure-tight container from the interior of the solvent container.

By opening this valve and due to the pressure difference between the interior of the pressure-tight container and the solvent container, a specific amount of solvent enters the gas-free and heated interior of the pressure-tight container and evaporates there suddenly. Alternatively, solvent steam can already get into the gas-free and heated interior of the pressure-tight container. According to the invention, the amount of solvent that gets into the pressure-tight container can be controlled via the pressure difference between the pressure-tight container and the solvent container, the opening angle and/or the opening cross section of the valve. In a special embodiment of the invention, the opening cross section can be continuously adjusted via a controllable valve.

Whether solvent steam gets into the interior or whether solvent gets into the interior and suddenly evaporates there ultimately depends on the temperature and pressure conditions in the interior and in the solvent container. However, it is advantageous if the solvent already reaches the interior as solvent steam. It is particularly advantageous in this case if the solvent container also has a negative pressure, particularly preferably an extensive vacuum. This allows higher-boiling solvents to evaporate at temperatures which are low enough not to destroy the molded part, for example a molded part made of a polymer with a comparatively low melting point. For diethylbenzene as a solvent, for example, a pressure in the solvent container of 60 mbar to 200 mbar at a solvent temperature of about 120° C. to 160° C. has proven to be advantageous. In this way, even for high-boiling solvents, a steam temperature can be achieved which is suitable for processing the molded parts without the molded parts being destroyed by the thermal load or dissolving or completely dissolving. For example, a pressure in the solvent container of 30 mbar to 500 mbar at a solvent temperature of about 50° C. to 170° C. has proven to be advantageous for bio-based solvents. In this way, even for high-boiling bio-based solvents, a steam temperature can be achieved which is suitable for processing the molded parts without the molded parts being destroyed by the thermal load or dissolving or completely dissolving. The negative pressure in the solvent container also has the advantage of a very safe process, since the negative pressure generated prevents solvent from escaping and, in the event of a leak, only air would be drawn in. The pressure in the solvent container can be monitored with the aid of a pressure sensor.

The temperature of the interior of the pressure-tight container and the negative pressure generated in the interior and the solvent temperature are to be coordinated so that the solvent introduced into the interior can suddenly evaporate unless solvent steam is already supplied to the interior of the pressure-tight container. Pressures in the interior of the pressure-tight container of less than 15 mbar, preferably less than 10 mbar, have proven to be particularly advantageous.

In the event that the solvent is already evaporated in a pressure-tight solvent container, and in particular in the event that this can only be achieved by generating a negative pressure in the solvent container (e.g., if diethylbenzene is to be evaporated at a maximum solvent temperature of 140° C. or if, for example, limonene is to be evaporated at a maximum solvent temperature of 140° C.), the particularly low pressure of less than 10 mbar in the interior of the pressure-tight container still has the technical advantage that there is a sufficiently large pressure gradient (between the interior of the pressure-tight container and the interior of the pressure-tight solvent container), to efficiently supply the evaporated solvent to the pressure-tight interior.

For solvents with a low evaporation temperature, the interior temperature of the pressure-tight container can be selected to be lower and/or lower negative pressures can be generated in the interior of the pressure-tight container. However, it has been proven that very high negative pressures, such as an almost perfect vacuum, favor the evaporation of the solvent introduced, in particular since an extensive vacuum should be generated anyway in order to prevent the molded parts from yellowing when heating the molded parts.

Due to the temperature difference between the molded parts introduced into the interior of the pressure-tight container and the solvent steam introduced into this interior (the molded parts initially have a lower temperature than the introduced solvent), the solvent steam condenses on the surface of the molded part. The solvent condensed on the surface of the molded part slightly dissolves the surface of the molded part, thereby closing pores on the surface and thereby smoothing the surface. How much steam condenses on the surface of the molded part depends substantially on the temperature difference between the molded part and the solvent steam introduced. In addition, the amount of condensate that forms on the surface of the molded part is decisive for the degree of dissolution and thus for the effective smoothing of the surface.

It is therefore important in the method according to the invention that, on the one hand, the correct steam temperature of the solvent is achieved since insufficient steam is formed at too low temperatures and the surface of the molded part is not sufficiently partially dissolved. In addition, if the steam temperatures are too low, a solvent condensate can settle on the surface of the molded part, but the temperature of the condensate can be too low to ensure the partial dissolution of the surface. It is therefore particularly advantageous for many molded part material/solvent combinations if the solvent is heated to a temperature of over 50° C.

On the other hand, excessively high steam temperatures can cause the partial dissolution of the surface of the molded part, which can lead to a change in the geometry of the molded part or as a result of which the formation of drops or runs is promoted. Furthermore, excessive dissolution of the surface during the subsequent vacuum drying can lead to the formation of bubbles on the surface.

On the other hand, the molded parts introduced into the interior must reach a specific temperature before introducing the heated solvent or before introducing the solvent steam so that the temperature difference between the molded part and the solvent steam causes a specific amount of condensate to be generated on the surface of the molded part. On the other hand, the temperature difference between the molded part and the solvent steam must not be too great, so that excessive condensate is prevented from forming on the surface of the molded part, which condensate can cause excessive partial dissolution of the surface of the molded part.

Ultimately, the parameters (internal temperature of the interior of the pressure-tight container or temperature of the molded part, temperature of the solvent and pressure in the interior of the pressure-tight container, and possibly pressure in the interior of the solvent container) must be adapted to one another depending on the solvent used and the material of the molded part, such that a specific amount of solvent condensate forms on the surface of the molded part to be treated, which causes the desired smoothing effect. The temperature of the molded part is in any case lower than the temperature of the solvent or the solvent steam. At the same time, the pressure in the interior of the pressure-tight container is lower than the pressure in the interior of the solvent container, both of which can have a negative pressure or an extensive vacuum.

By introducing the solvent into the negative pressure interior of the pressure-tight container and the sudden evaporation of the solvent or by introducing the solvent steam into the negative pressure interior of the pressure-tight container, the temperature in the interior of the pressure-tight container increases steadily. The condensation of the solvent steam brings about a pressure reduction in the interior of the pressure-tight container, as a result of which further solvent is continuously introduced into the interior and suddenly evaporates or further solvent steam is continuously introduced into the interior.

The valve remains open until a specified temperature is reached in the interior of the pressure-tight container. The temperature to be achieved in the interior of the pressure-tight container (target temperature or specified second temperature) is selected so that only as much condensate forms on the surface of the molded part as is sufficient for the desired smoothing effect.

If the valve is kept open for too long, the temperature in the interior of the pressure-tight container can rise above the desired target temperature, which can lead to an excessive amount of condensate on the surface of the molded part and thus to excessive dissolution of the surface of the molded part. If the surface of the molded part is too strongly dissolved by the solvent condensate, material bubbles can form during the subsequent vacuum drying (step S5), since the solvent-plastics material mixture formed on the surface can start boiling. When the surface hardens at the same time, bubbles or craters can then form.

It has proven to be advantageous if the valve is kept open for a time between 1 s and 600 s. A valve opening time of 5 to 300 s is particularly advantageous. However, it should be noted that the valve opening time depends on the design of the valve and the valve opening time may have to be adapted to the valve diameter.

It has proven advantageous to rotate the molded parts introduced into the pressure-tight container during the vaporization phase in the interior or alternatively to rotate the molded parts rigidly arranged in the interior together with the interior or with the pressure-tight container. This can significantly reduce the formation of droplets.

The avoidance or considerable reduction of the formation of droplets can alternatively or additionally also be brought about by means of a swirling unit, for example a fan, which is arranged in the interior of the pressure-tight container and swirls the introduced solvent steam. Such a turbulence in the introduced solvent steam can also be caused or promoted by the pressure difference between the interior of the solvent container and the interior of the pressure-tight container.

The provision of a turbulence unit also has the advantage that the solvent steam also reliably reaches the covered or internal surfaces of the molded part.

After the introduction of the solvent or the solvent steam into the interior of the pressure-tight container, a specified holding time H (step S4a) can (optionally) be provided, during which solvent steam is neither supplied to the interior of the pressure-tight container nor suctioned off of the interior of the pressure-tight container. During this holding time, the molded part is in an environment that occurs immediately after the introduction of the solvent or the solvent steam into the interior of the pressure-tight container. The heating device can be used to ensure that the temperature in the interior of the pressure-tight container remains to a large extent constant during the holding time. By providing this holding time, an even better smoothing effect can be achieved.

It has proven to be advantageous if a turbulence in the solvent steam in the interior of the pressure-tight container is also caused during the holding time, for example using the turbulence unit mentioned above. This also prevents drops or bubbles from forming on the surface of the molded parts during the holding time.

By providing the holding time and in particular in combination with the turbulence in the solvent steam during the holding time, an even more uniform dissolution of the surface of the molded part can also be ensured.

After the heated solvent has been introduced in step S4 or after the holding time H (step S4a), the molded parts are dried in step S5. In one embodiment of the invention, the molded parts can be removed from the pressure-tight container for drying.

In an alternative embodiment of the invention, which has been found to be advantageous, it is provided that the molded parts are dried in the interior of the pressure-tight container which has the negative pressure. This has the advantage that the drying process takes place considerably faster in the case of negative pressure or vacuum. It is particularly advantageous if the solvent steam in the interior of the pressure-tight container and, if necessary, the solvent condensate formed on the interior wall and accumulated on the bottom of the interior is suctioned off in a step S4.1 immediately before drying the molded parts. The suction of solvent can also take place during the entire drying process. This has the advantage that already condensed solvent can run off directly and does not have to be evaporated again before it is removed from the chamber. This means that the molded part can be dried within a few seconds.

After drying, a further specified holding time H (step S5a) can (optionally) be provided. During this additional holding time, the molded part is in an environment that occurs immediately after drying or after the solvent steam has been suctioned off. The heating device can be used to ensure that the temperature in the interior of the pressure-tight container remains to a large extent constant during this further holding time. By providing this additional holding time, solvent residues on the surface of the molded part can be reduced.

The suctioned-off solvent steam or solvent condensate can then be filtered and cleaned, if necessary, and then returned to the solvent container. This means that the solvent can be used in a cycle. This has the technical advantage that there are no materials or other waste that need to be disposed of during the process. The process is therefore a resource-saving, efficient method. In addition, suctioning off the solvent ensures that the user never comes into direct contact with the solvent.

Particularly efficient vacuum-drying (or negative pressure drying) can be achieved if the generation of the negative pressure/vacuum in the pressure-tight chamber is interrupted by a controlled inflow of a transport gas. In one embodiment of the invention, such an inflow of the transport gas can be carried out cyclically, i.e. the generation of the negative pressure/vacuum is cyclically interrupted. This has the technical advantage that even vacuum pumps with a lower suction power can completely remove the solvent residues from the interior of the pressure-tight container. In order to prevent the solvent from condensing again on the surface of the molded parts due to the pressure increase in the interior of the pressure-tight container, which is caused by the supply of the transport gas, it is particularly advantageous if the inflowing amount of transport gas is controlled and the pressure in the pressure-tight interior does not increase too much. A pressure increase from 8 mbar to approximately between 50 mbar and 100 mbar and a subsequent renewed evacuation to 8 mbar or less has proven to be particularly advantageous and efficient. In the event that an oxygen-containing gas, such as air, is used as the transport gas, "keeping the pressure low" (i.e. the pressure is kept below 300 mbar, preferably 100 mbar) also has the technical advantage that yellowing of the parts is prevented due to oxidation. This risk would exist in the event that a lot of oxygen penetrates the chamber during the drying process, since the molded parts are still at an elevated temperature at this point in time and are therefore very sensitive to oxidation, for example in the case of molded parts made of polyamide.

After vacuum-drying the molded part, it can be removed from the pressure-tight container in a last step, with the interior of the pressure-tight container optionally being able to be cooled to a specific temperature before the molded part is removed. In particular in the case of vacuum-drying directly before the molded parts are removed, the efficient vacuum drying described above with the supply of a transport gas is to be preferred to drying without the supply of a transport gas.

Steps S4, S5, and, if applicable, S4.1, S4a and S5a are referred to together as a cycle (processing cycle).

In one embodiment of the invention, it can be provided that this cycle, i.e. steps S4 and S5 and, if necessary, steps S4.1, S4a and S5, be repeated a plurality of times. This has proven to be particularly advantageous when the partial dissolution of the surface, which is brought about by the introduction of the solvent steam in step S4, cannot achieve a sufficient smoothing effect. This can be the case, for example, if, due to the material of the molded part and the solvent used, only very short vaporization times are possible without damaging the molded part.

Figure 3:
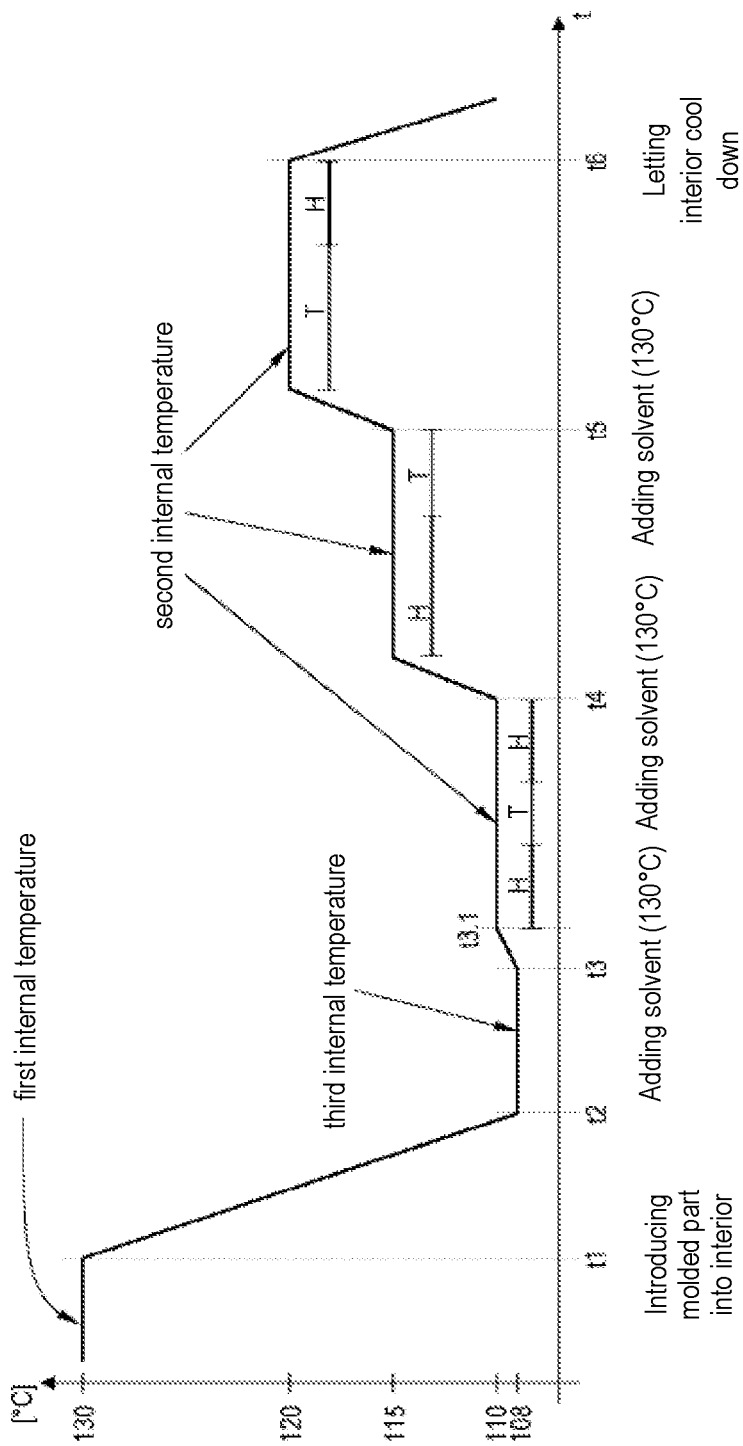
FIG. 3 is a first example of a temperature profile of the internal temperature of an interior of a surface treatment device, a solvent being added to the interior three times.

After the first cycle, i.e. after the first steaming and the first vacuum-drying of the molded parts, the temperature of the molded part is higher than at the beginning of the first cycle, because the introduction of the solvent steam increases the temperature in the interior of the pressure-tight container and thus also the temperature of the molded part. This means that, in the next cycle, steam must be supplied to the interior of the pressure-tight container until the interior or the molded part reaches a temperature at which sufficient condensate is deposited on the surface of the molded part to achieve the desired smoothing effect (for example, as shown in FIG. 3). Since the temperature of the molded part is higher at the beginning of the second cycle than at the beginning of the first cycle (if the molded part is not cooled between two cycles), the temperature difference between the temperature of the molded part and the temperature of the solvent is no longer large enough to prevent the addition of the same amount of solvent as in the first cycle to generate sufficient condensate on the surface of the molded part.

In principle, this cycle can be repeated as often as required. However, there are limits to the number of repetitions where, due to the repetitions, the temperature of the molded part reaches a value at which the molded parts would be destroyed. An exemplary temperature profile of the internal temperature of the interior of the pressure-tight container is described in more detail with reference to FIGS. 3 to 7.

In order to compensate for the lower temperature difference between the molded part and the solvent introduced after each cycle, provision can also be made to further heat the solvent accordingly after each cycle in order to achieve the desired temperature difference between the temperature of the molded part and the temperature of the solvent.

Figure 4:
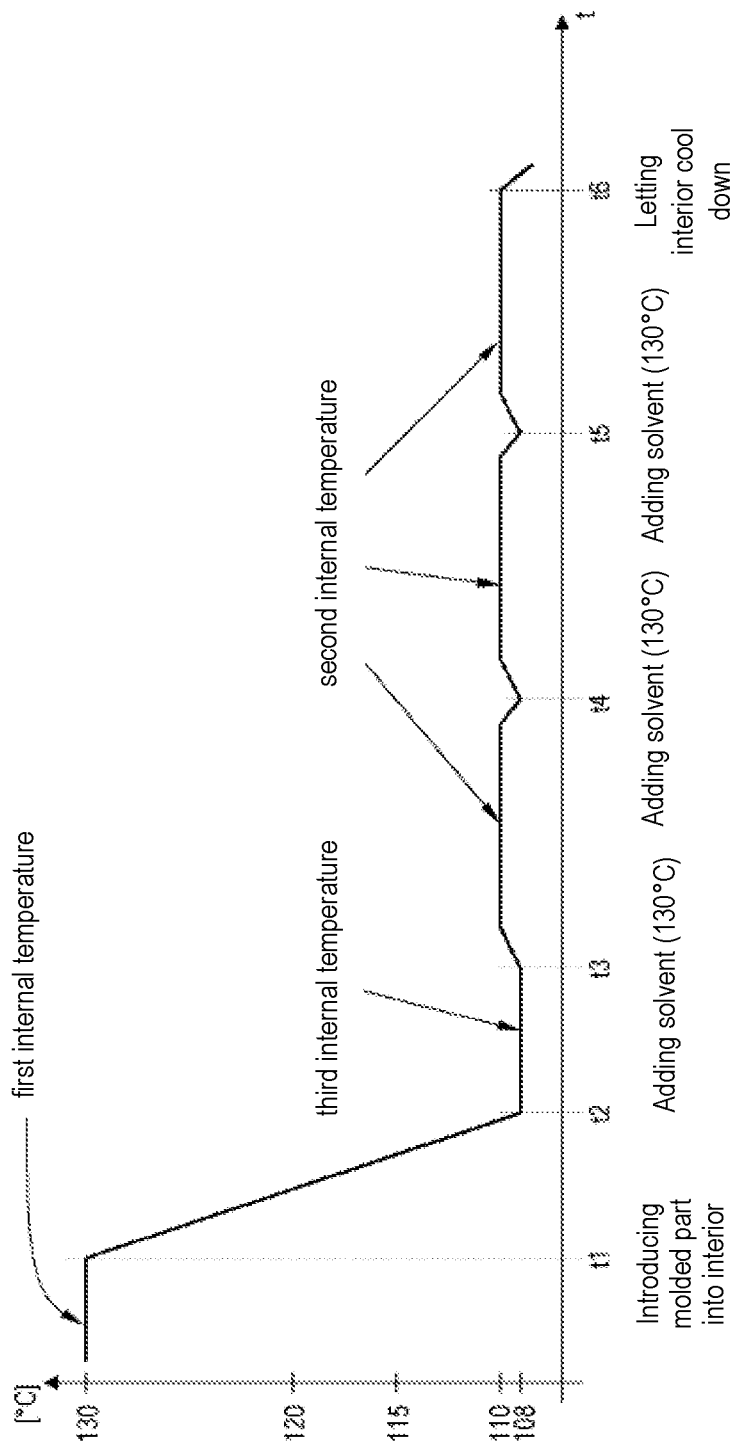
FIG. 4 is a second example of a temperature profile of the internal temperature of an interior of a surface processing device, a solvent being added to the interior three times.

In an alternative embodiment of the method, the temperature of the interior of the pressure-tight container can be reduced before the heated solvent is introduced in the next cycle, preferably until the desired temperature difference between the molded part and the solvent to be introduced is reached again. For example, the temperature of the interior can be reduced to the value at which solvent was introduced into the interior in the first cycle (as shown in FIG. 4). The cooling can already be achieved here indirectly by means of the evaporative cooling during the generation of the negative pressure or the vacuum. In this alternative embodiment of the method, the molded part can be vaporized as often as desired, i.e. as many cycles as desired can be repeated. However, it has been shown that, depending on the material of the molded part and depending on the solvent used, between three and six cycles can be sufficient to achieve an optimal smoothing result.

The method according to the invention is particularly suitable for molded parts that are produced in the SLS (selective laser sintering) method, MJF (MultiJet fusion) method, HSS (high speed sintering) method, FDM (fused deposition modeling) method, STEP (selective thermoplastic electrophotographic process) and SLA (stereolithography) method. The method according to the invention is particularly advantageous for molded parts which are produced in particular in a powder-based layer construction, in which individual layers are fused together, such as the SLS method, the MJF method or the HSS method, because the surface is particularly rough and has pores in the case of these powder-based processes. In addition, the method according to the invention is particularly advantageous for the FFF (fast filament fabrication) method and the FDM (fused deposition molding) method, since the diameter of the filament used creates a very rough surface perpendicular to the printing direction.

For the production of the molded parts, polymers, in particular the materials mentioned below, can be used which are particularly well suited for the smoothing of the surface according to the invention of the molded parts produced from them:

For the production (printing) of the molded part, the material can be selected from the group comprising thermoplastics and light-curing plastics materials.

According to the invention, plastics materials are to be understood as pure polymers, copolymers and mixtures thereof. These include plastics materials selected from the group comprising polyesters, polyamides, polyurethanes, polyketones, polyimides, polyimines, polysulfides, polysulfones, polyolefins, polycarbonates, polyacrylonitriles, polyphthalates, polythioethers, rubbers, latex, polyacrylates and cyanate esters.

According to the invention, non-polar, halogen-free solvents are particularly suitable for non-polar plastics materials such as polyolefins (e.g., polypropylene, polyethylene, polymethylpentene, polybutylene), polyketones (e.g., polyethyl ether ketones, polyaryl ether ketones, polyether ketone ketones), polystyrenes, polycarbonates and polysulfones, since these plastics materials cannot be sufficiently smoothed with polar solvents.

However, other materials can also be used, provided they are suitable for a 3D printing method and the surface of the molded parts produced with them can be partially dissolved by means of a solvent steam according to the method according to the invention.

The solvents mentioned below have proven suitable as non-polar, halogen-free solvents (which in the context of the present invention also include high boilers), although other non-polar, halogen-free solvents not mentioned here can also be used:

The non-polar solvent can be selected from the group comprising
- un-, mono- and polysubstituted benzenes (for example benzene, alkylbenzenes, in particular toluene, xylenes, monoethylbenzene, diethylbenzene, triethylbenzene, methylethylbenzene, diisooctyl phthalate, dimethylaniline, tetrahydronaphthalene),
- un-, mono- and polysubstituted open-chain alkanes (e.g., butane, pentane, hexane, heptane),
- un-, mono- and polysubstituted open-chain alkenes (e.g., butenes, pentenes, hexenes, heptenes),
- un-, mono- and polysubstituted cyclic, aliphatic hydrocarbons (e.g., cyclohexane, decaline, cubane, dicyclopentadiene, methylcyclohexane, limonene),
- carboxylic acid esters (e.g., butyl acetate, dioctyl adipate, acrylic acid ester, ethyl butyrate),
- un-, mono- and polysubstituted open-chain ethers (e.g., dimethyl ether, diethyl ether, diisopropyl ether, methyl isopropyl ether, diphenyl ether),
- un-, mono- and polysubstituted cyclic ethers (e.g., tetrahydrofuran (THF), dioxane, furfural),
- un-, mono- and polysubstituted ketones (e.g., biisobutyl ketone) and
- combination or mixtures thereof.

According to the method according to the invention, which preferably takes place under negative pressure, non-polar, halogen-free, flammable solvents can be used. Solvents which have a flash point above 40° C. have proven to be advantageous. Solvents having a flash point above 52° C. are particularly advantageous. However, the invention is not restricted to these solvents, since an explosion can also be prevented by an inert environment, e.g., nitrogen.

Solvents from the following list have been found to be advantageous from a flammability point of view: o-, m-, p-diethylbenzene, trimethylbenzene, triethylbenzene, ethyltoluene, decalin, tetrahydronaphthalene, diphenyl ether, ethyl butyrate, furfural and limonene.

Among these solvents, the following solvents should be mentioned as particularly advantageous, taking into account the health hazards of these substances: o-, m-, p-diethylbenzene, hemellitol (1,2,3-trimethylbenzene), 1,2,4-triethylbenzene, 1,3,5-triethylbenzene, diphenyl ether, ethyl butyrate and limonene.

Solvents that are approved herein for processing plastics material for food have proven to be particularly advantageous (for example, according to Regulation (EU) No. 10/2011 of the Commission of Jan. 14, 2011 on materials and objects made of plastics material that are intended to come into contact with food), as these applications benefit in particular from a smoothed surface of the molded parts. Surfaces smoothed according to the invention are water-repellent and thus efficiently prevent possible germ growth. This class of solvents includes p-cymene and limonene, among others.

The use of p-cymene and diethylbenzene also has the advantage that the solvent is prevented from spreading and that any solvent that escapes due to handling errors is to easily disposed of since they are non-volatile substances.

The bio-based solvents mentioned below have also proven advantageous as solvents (which in the context of the present invention also include high boilers, and compounds that have not previously been used as solvents), wherein also other bio-based solvents not mentioned here can also be used:

The group consisting of bio-based solvents includes in particular terpenes and terpenoids (oxygen-containing terpene derivatives). Terpenes and terpenoids offer a plurality of advantages over halogenated solvents and other standard industrial synthetic solvents. Terpenes and terpenoids are mostly of biological origin (natural substances) and biodegradable. Biodegradability is an advantage, in particular when compared to biopersistent and greenhouse-damaging halocarbons. In addition, for many terpenes, there is a high availability and an economic advantage (e.g., limonene from industrial orange peel waste, terpinene from conifers). In contrast to most cyclic and acyclic hydrocarbons, terpenes have a very low toxicity and are sometimes used as pharmacologically valuable substances in medicinal products (e.g., 1,8-cineole for respiratory diseases). Many terpenes and terpenoids are also used as scents and flavorings.

The term terpene encompasses a wide range of chemical compounds formally derived from isoprene. According to the invention, the following terpenes and terpenoids can be used as solvents:
- acyclic monoterpenes, in particular myrcene (7-methyl-3-methylene-1,6-octadiene), ocimene (3,7-dimethyl-1,3,6-octatriene), cosmene, linalool, nerol and lavandulol
- cyclic monoterpenes, in particular p-menthane, p-cymene, β-phellandrene, α-phellandrene, D-limonene, L-limonene, dipentene (racemic mixture), α-terpinene, γ-terpinene, terpinene (mixture of substances), pinene (α-pinene, β-pinene and δ-pinene), pinane, menthene, camphene, isobornylan, isocamphane, bornane, terpinene (terpinolene), sabinene, α-thujene, β-thujene, carane, carene (3-carene, 2-carene), fenchan, α-fenchen, β-fenchen,
- diterpenes, in particular neocembrene (cembrene A)
- sesquiterpenes, in particular valencenes,
- terpenoids, in particular 1,8-cineole, 1,4-cineole, cis-(+)-limonene-1,2-oxide, trans-(+)-limonene-1,2-oxide, limonene-1,2:8,9-dioxide (mixture), thymol, α-pinene oxide and β-pinene oxide monoterpene ketones and monoterpene aldehydes such as D-camphor, L-camphor, carvone, nopionone, norcamphor and citronellal monoterpene alcohols such as menthol, isopulegol, terpineols (α-, β-, γ- and δ-terpineol), 4-terpinenol (terpinen-4-ol), trans-p-menthan-8-ol, carvacrol, borneols, geraniol and lavandulol monoterpenes with heteroatoms such as p-menth-1-en-8-thiol terpenoid esters such as linalyl acetate, geranyl acetate, lavandulol acetate, geraniol butyrate The compounds mentioned can be used as pure substances or as a component of mixtures. Mixtures of the compounds mentioned with one another or natural mixtures of substances with a natural distribution of components, such as fractions of *eucalyptus* oil, are also possible.

Natural substances and bio-based substances that do not belong to the terpene group are also suitable. In particular, aromatic compounds such as alkylphenols from lignin are suitable as solvents for the method according to the invention. Examples of such compounds are 1-phenylethanol, guaiacol, 4-methylguaiacol, 4-ethylguaiacol, 4-methoxy-α-methylbenzyl alcohol, methyl salicylate, phenylpropanoids (anethole, apiol, cinnamaldehyde, dillapiol, estragole), phenylpropenes (eugenol, safrole, myristicin, elemicin, estragole), methyl benzoate, ethyl benzoate, vanillin, anisole, benzaldehyde, phenethyl alcohol, benzyl acetate, anisole acetate, carvacrol, cinnamyl acetate and isoeugenol.

Other suitable bio-based compounds are:
cyclic and acyclic carbonate esters (ethylene carbonate, propylene carbonate, dimethyl carbonate ester, diethyl carbonate ester, diphenyl carbonate ester)

furan-based ethers (furans, 2-amylfuran, tetrahydrofurans, in particular 2-methyltetrahydrofuran, tetrahydro-2-methyl-3-furanone)

lactic acid esters, in particular ethyl lactate and methyl lactate diethyl succinate pyruvic acid alkyl esters (in particular ethyl pyruvate)

ethylene glycol diacetate pentyl acetate, isopentyl acetate acetoacetic ester levulinic acid levulinic acid ethyl ester acetaldehyde diethyl acetal methyl isohexenyl ketones 2-(butyryloxy)propionic acid butyl ester butyric acid hexyl ester isovaleric acid 2-methylbutyl ester lactones (δ-decalactone, γ-decalactone, γ-octalactone, γ-valerolactone, δ-dodecalactone, δ-nonalactone, δ-tetradecalactone, γ-dodecalactone, γ-hexalactone, γ-nonanolactone, γ-valerolactone)

Bio-based solvents that are approved for processing plastics material for food have proven to be particularly advantageous (for example, according to Regulation (EU) No. 10/2011 of the Commission of Jan. 14, 2011 on materials and objects made of plastics material that are intended to come into contact with food), as these applications benefit in particular from a smoothed surface of the molded parts. Surfaces smoothed according to the invention are water-repellent and thus efficiently prevent possible germ growth. This class of solvents includes 1,8-cineole, limonene, terpinene and terpineols, among others.

In one embodiment of the invention, additives can be added to the bio-based solvent. The additives according to the invention are one or more antioxidants, heat stabilizers and polymerization inhibitors. They are preferably added to the bio-based solvent in concentrations of between 5 ppm and 4000 ppm each.

Suitable antioxidants are preferably sterically hindered and non-volatile phenolic compounds such as 2,6-di-tert-butyl-4-methylphenol (BHT), 1,3,5-trimethyl-2,4,6-tris(3,5-di-tert-butyl-4-hydroxybenzyl)benzene, pentaerythritol tetrakis(3-(3,5-di-tert-butyl-4-hydroxy-phenyl)propionate), octadecyl-3-(3,5-di-tert-butyl-4-hydroxyphenyl)propionate, triethylene glycol bis(3-tert-butyl-4-hydroxy-5-methylphenyl)propionate, 2,2'-thio-bis(4-methyl-6-tert-butylphenol) and 2,2'-thiodiethyl bis[3-(3,5-di-tert-butyl-4-hydroxyphenyl)propionate]. Furthermore, sterically hindered amines (HALS) such as diarylamines (e.g., 4,4-bis(a,a-dimethylbenzyl)diphenylamine) or compounds based on tetramethylpiperidine (e.g., bis(2,2,6,6-tetramethyl-4-piperidyl)sebacate) can be used. In particular organic phosphites and phosphonites such as, for example, tris(2,4-di-tert-butylphenyl)phosphite, bis(2,6-di-tert-butyl-4-methylphenyl)pentaerythritol diphosphite, 3,9-bis(octadecyloxy)-2,4,8,10-tetraoxa-3,9-diphosphaspiro[5.5]undecane and tetrakis(2,4-di-tert-butylphenyl)[1,1-biphenyl]-4,4'-diylbisphosphonite can be used independently or in combination with other stabilizers. Combinations of phenol-based compounds (primary antioxidants) with phosphorus-based compounds (secondary antioxidants) are particularly effective. Other possible additives with a stabilizing effect include 2,2-(2,5-thiophenediyl)bis(5-tert-butylbenzoxazole), phenothiazine, hydroquinones, hydroquinone ethers, quinone alkyds and nitroxyl compounds, as well as mixtures thereof, benzoquinones, copper salts, zinc salts, calcium stearate, catechols, cresols, nitrobenzene and benzotriazoles.

Since the stabilizers do not evaporate with the bio-based solvent, but have a significantly higher boiling or decomposition temperature, the bio-based solvent can be easily separated from the additives. In the event of a solvent exchange, for example, the bio-based solvent can be disposed of separately from the stabilizers.

At the same time, the molded part to be treated only comes into contact with the vapor of the bio-based solvent and not with the additives. This is particularly advantageous if solvents that are suitable for processing plastics materials that come into contact with food are used for processing the molded part.

Before the surface of a molded part produced according to a 3D printing method is treated, the molded part can be mechanically processed, for example blasted, in order to remove excess powder, for example. This is particularly advantageous because powder residues would also be partially dissolved and then harden on the surface. If there is too much residual powder on the surface, the smoothing result can be negatively affected.

In addition, the molded parts can be blasted with plastics material balls before or after smoothing in order to achieve a compacting of the surface. It is advantageous here if the plastics material balls have a lower degree of hardness than the material of the molded part; this ensures that the surface is compacted without damaging the surface.

In one embodiment of the invention, the molded parts can be colored before or after smoothing and/or can be impregnated or painted after smoothing.

Before the surface of a molded part produced according to a 3D printing method is treated, the molded part can be mechanically processed, for example blasted, in order to remove excess powder, for example. This is particularly advantageous because powder residues would also be partially dissolved and then harden on the surface. If there is too much residual powder on the surface, the smoothing result can be negatively affected.

In addition, the molded parts can be blasted with plastics material balls before or after smoothing in order to achieve a compacting of the surface. It is advantageous here if the plastics material balls have a lower degree of hardness than the material of the molded part; this ensures that the surface is compacted without damaging the surface.

In one embodiment of the invention, the molded parts can be colored before or after smoothing and/or can be impregnated or painted after smoothing.

FIG. 3 shows a temperature profile of the interior of the pressure-tight container or of the molded part introduced into this interior while carrying out a method according to the invention in which three cycles (steps S4 to S5) are executed, wherein the temperature of the molded part or the internal temperature of the interior increases after each cycle.

A cycle can, however, also include multiple vaporizations of the surface with the vaporous solvent, the internal temperature being able to be adjusted between each vaporization of the surface. With the temperature profile shown in FIG. 3, the three cycles shown and described below can also be part of a single cycle. This also applies to the other temperature profiles shown with reference to FIGS. 4 to 7.

For the example shown in FIG. 3, the material polypropylene was used to produce the molded part. Diethylbenzene was used as the solvent.

Diethylbenzene is generally to be understood as meaning a mixture of isomers of 1,2-, 1,3- and 1,4-diethylbenzene, the mixing ratio preferably being as follows:

1% to 35% 1,2-diethylbenzene,
25% to 85% 1,3-diethylbenzene and
5% to 60% 1,4-diethylbenzene.

The following mixing ratio is particularly preferred:
1% to 25% 1,2-diethylbenzene,
40% to 85% 1,3-diethylbenzene and
20% to 55% 1,4-diethylbenzene.

In both cases, the components add up to 100%.

The interior of the pressure-tight container is first brought to a first internal temperature of about 130° C. At time t1, the molded part is placed in the interior and the pressure-tight container is closed in a pressure-tight manner, and a vacuum is generated to a large extent in the interior. The molded part placed in the interior is heated by the radiant heat of the interior, as a result of which the first interior temperature drops at the same time to a third internal temperature, which is approximately 108° C. At time t2, the temperature of the molded part corresponds to a large extent to the third internal temperature.

At time t3, which can be immediately after time t2, the solvent heated to 130° C. is added, which evaporates suddenly or enters the interior of the pressure-tight container as solvent steam. The solvent steam then condenses on the surface of the molded part, since the temperature difference between the temperature of the molded part and the temperature of the solvent steam is about 22° C.

When the solvent is added, the internal temperature rises by about 2° C. to a second internal temperature (in this case, about 110° C.). After this second internal temperature has been reached (at the time t3.1), the supply of solvent is stopped and vacuum-drying of the molded part is carried out. The solvent steam still in the interior can be suctioned off. Solvent condensate present on the inner walls of the interior or on the bottom of the interior can also be suctioned off. The drying process then takes a few seconds.

Before starting the drying process T and before suctioning off the solvent steam, a specified holding time H can be provided, during which the molded part is in an environment that is adjusted immediately after the introduction of the solvent or the solvent steam (at time t3.1) in the interior of the pressure-tight container. After the holding time H has been reached, the drying process T can be started and the solvent steam can be suctioned off. Following the drying process T, a further holding time H can be provided. The holding times are between 0.5 s and 600 s, preferably between 1 s and 60 s. The two holding times can be of different lengths. One of the two holding times can also be dispensed with.

After the molded part has dried, solvent is added again at time t4, which molded part still has a temperature of about 130° C. Since the temperature difference between the molded part and the solvent introduced is now lower (in this case, approx. 20° C.) than at time t3, the second internal temperature and thus the temperature of the molded part must be increased even further (in this case, to approx. 115° C.) by adding the solvent, so that sufficient solvent steam can condense on the surface of the molded part for the desired smoothing effect. The molded part is then vacuum-dried again.

The third cycle is started at time t5, in which solvent heated to 130° C. is added again. Since at time t5 the temperature difference between the temperature of the molded part and the added solvent is even smaller (in this case, approx. 15° C.) than at time t4, the second internal temperature and thus the temperature of the molded part must be increased even further by adding the solvent, present at about 120° C. This ensures that sufficient solvent steam can also condense on the surface of the molded part for the desired smoothing in the third cycle. The molded part is then vacuum-dried.

After each addition of solvent or solvent steam, the holding times mentioned above can be provided.

In the example shown in FIG. 3, after the second addition of solvent (at time t4), a holding time H is provided before the drying process T is initiated. However, a further holding time after the drying process T is not provided here.

In addition, in the example shown in FIG. 3, after the third addition of solvent (at point in time t5), the drying process is first carried out without a previous holding time. A holding time H is then provided after the drying process.

In one embodiment of the invention, provision can be made for the holding times to be provided only in the first cycle, i.e., between times t3.1 and t4.

The holding times mentioned can also be provided in the examples shown in FIGS. 4 to 7.

At time t6, cooling of the interior and thus of the molded part is finally initiated. After a specific interior temperature has been reached, in the present case between approximately 105° C. and 110° C., the molded part can be removed from the interior. This cooling process is only optional, i.e. the molded parts can be removed directly after drying. The cooling process, however, has the advantage that the yellowing of the removed molded parts is prevented since the cooling process takes place under negative pressure or under vacuum. In addition, controlled cooling can reduce the thermal stress to which the molded part is exposed during cooling.

Of course, the interior of the pressure-tight container must be brought to atmospheric pressure before removing the molded parts.

The second internal temperature to be achieved in the second and third cycle can be reduced if the solvent temperature for the second and for the third cycle is increased accordingly. For example, an increase in the solvent temperature from 130° C. to 135° C. in the second cycle can be sufficient, so that the second internal temperature only needs to be increased from 110° C. to 112° C. in the second cycle, since in this case the temperature difference at time t4 between the temperature of the molded part and the temperature of the solvent is approximately the same as at time t3. However, such an increase in the solvent temperature is only possible if the increased solvent temperature does not lead to excessive dissolution or damage to the surface of the molded part.

FIG. 4 shows a temperature profile of the internal temperature of the interior, the internal temperature of the interior and thus the temperature of the molded part being cooled to a specific value after each cycle.

In this case, too, PP was used to manufacture the molded part. In this case, too, diethylbenzene was used as the solvent.

First, the interior of the pressure-tight container is brought to a first internal temperature of about 130° C. At time t1, the molded part is placed into the interior and the interior is closed in a pressure-tight manner. A vacuum is then generated to a large extent in the interior. The temperature difference between the temperature of the molded part and the first internal temperature means that the first internal temperature drops to a third internal temperature by time t2 and the temperature of the molded part rises to this third internal temperature (in this case, approx. 108° C.).

After this third internal temperature has been reached, a solvent heated to 130° C. is added at time t3, which solvent evaporates suddenly in the interior or which already reaches the interior as solvent steam. The solvent steam condenses on the surface of the molded part and thereby effects the desired smoothing. By adding the solvent, the internal temperature of the interior and thus also the temperature of the molded part rise from the third internal temperature to the second internal temperature (in this case, approx. 110° C.). As soon as this second internal temperature has been reached, the introduction of the solvent is stopped. The molded part is then vacuum-dried.

After completion of the drying process, the interior is cooled down, preferably to the third internal temperature, as at time t2 (in this case, therefore to approx. 108° C.). This ensures that, in the next cycle, the temperature difference between the temperature of the molded part and the temperature of the solvent is the same as at time t3.

After cooling the interior or the molded part, the solvent heated to 130° C. is added again at time t4. In contrast to the temperature profile shown in FIG. 3, the second internal temperature to be reached after time t4 does not have to be higher in this second cycle than in the first cycle. It is sufficient to bring the second internal temperature in the second cycle to the second internal temperature as in the first cycle (i.e., to about 110° C.) by adding the solvent to the interior. Because of the temperature difference between the temperature of the molded part and the temperature of the solvent at the beginning of the second cycle, sufficient steam can condense on the surface of the molded part for the desired smoothing. The molded part is then vacuum-dried again and the internal temperature of the interior is lowered again, preferably to the third internal temperature as at time t2.

The third cycle is identical to the second cycle and is initiated at time t5 by adding the solvent heated to 130° C.

The third cycle is completed at time t6 and the interior can be cooled to a specified temperature. The molded parts can then be removed from the pressure-tight container. However, this cooling process can also be dispensed with and the molded part can be removed directly after drying. In this case as well, the cooling process has the advantages mentioned with reference to FIG. 3.

Figure 5:
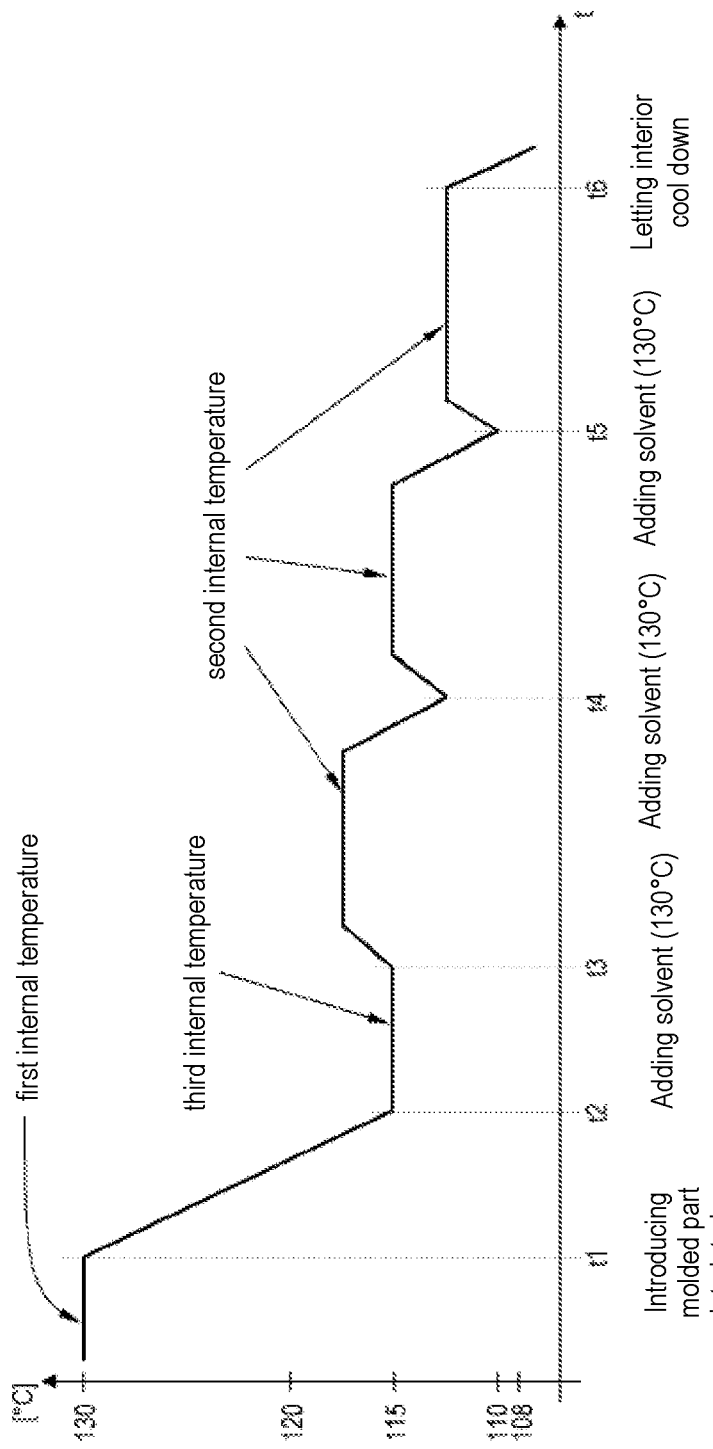
FIG. 5 is a third example of a temperature profile of the internal temperature of an interior of a surface processing device, a solvent being added to the interior three times.

FIG. 5 shows a temperature profile of the internal temperature of the interior, the internal temperature of the interior and thus the temperature of the molded part being cooled to a specific value after each cycle.

In this case, too, PP was used to manufacture the molded part. In this case, too, diethylbenzene was used as the solvent.

First, the interior of the pressure-tight container is brought to a first internal temperature of about 130° C. At time t1, the molded part is placed into the interior and the interior is closed in a pressure-tight manner. A vacuum is then generated to a large extent in the interior. The temperature difference between the temperature of the molded part and the first internal temperature means that the first internal temperature drops to a third internal temperature by time t2 and the temperature of the molded part rises to this third internal temperature (in this case, approx. 115° C.).

After this third internal temperature has been reached, a solvent heated to 130° C. is added at time t3, which solvent evaporates suddenly in the interior or which already reaches the interior as solvent steam. The solvent steam condenses on the surface of the molded part and thereby effects the desired smoothing. By adding the solvent, the internal temperature of the interior and thus also the temperature of the molded part rise from the third internal temperature (in this case, approx. 115° C.) to the second internal temperature (in this case, approx. 117.5° C.), i.e. by approx. 2.5° C. As soon as this second internal temperature has been reached, the introduction of the solvent is stopped. The molded part is then vacuum-dried.

After the drying process is complete, the interior is cooled down. While in the example shown in FIG. 4 the temperature of the interior was lowered to the temperature as at time t2, in the example shown in FIG. 5 the temperature of the interior is lowered to a temperature below the temperature as at time t2 (in this case, by approx. 5° C. to 112.5° C.). This ensures that at the beginning of the next cycle the temperature difference between the temperature of the molded part and the temperature of the solvent is larger than at the beginning of the previous cycle (at time t3).

After cooling the interior or the molded part, the solvent heated to 130° C. is added again at time t4. In contrast to the temperature profile shown in FIG. 4, the second internal temperature to be reached after time t4 can be lower in this second cycle (in this case, approx. 115° C.) than in the first cycle. Because of the greater temperature difference at time t4 between the temperature of the molded part and the temperature of the solvent, sufficient steam can nevertheless condense on the surface of the molded part for the desired smoothing. The molded part is then vacuum-dried again and the internal temperature of the interior is lowered again (in this case, to around 110° C.).

The third cycle is identical to the second cycle and is initiated at time t5 by adding the solvent heated to 130° C., whereby the second internal temperature rises to about 112° C.

The third cycle is completed at time t6 and the interior can be cooled to a specified temperature. The molded parts can then be removed from the pressure-tight container. However, this cooling process can also be dispensed with and the molded part can be removed directly after drying. In this case as well, the cooling process has the advantages mentioned with reference to FIG. 3.

The advantage in this case is that, due to the constant cooling, the surface of the molded part is dissolved less in each cycle, which results in gentler smoothing. The higher temperatures in the first cycle have the advantage that a quick first smoothing is achieved.

It can also be advantageous to reduce the temperature of the solvent after each cycle, for example by 2° C. to 5° C. This also applies to the variants shown with reference to FIGS. 3, 4, 6, and 7.

Figure 6:
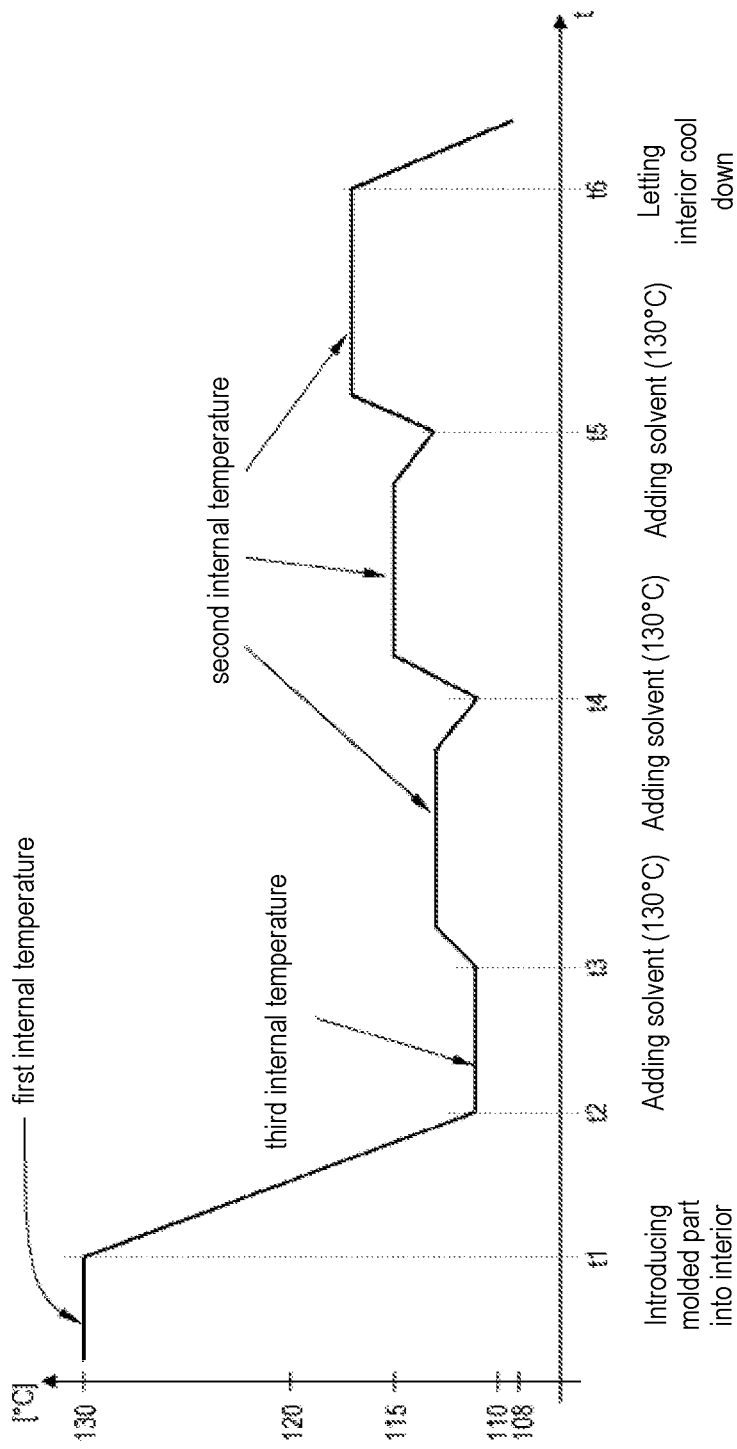
FIG. 6 is a fourth example of a temperature profile of the internal temperature of an interior of a surface processing device, a solvent being added to the interior three times.

FIG. 6 shows a temperature profile of the internal temperature of the interior, the internal temperature of the interior and thus the temperature of the molded part being cooled to a specific value after each cycle. In contrast to the temperature profile shown in FIG. 5, the second internal temperature in each cycle is higher than in the previous cycle.

In this case, too, PP was used to manufacture the molded part. In this case, too, diethylbenzene was used as the solvent.

First, the interior of the pressure-tight container is brought to a first internal temperature of about 130° C. At time t1, the molded part is placed into the interior and the interior is closed in a pressure-tight manner. A vacuum is then generated to a large extent in the interior. The temperature difference between the temperature of the molded part and the first internal temperature means that the first internal temperature drops to a third internal temperature by time t2 and the temperature of the molded part rises to this third internal temperature (in this case, approx. 111° C.).

After this third internal temperature has been reached, a solvent heated to 130° C. is added at time t3, which solvent evaporates suddenly in the interior or which already reaches the interior as solvent steam. The solvent steam condenses on the surface of the molded part and thereby effects the desired smoothing. By adding the solvent, the internal temperature of the interior and thus also the temperature of the molded part rise from the third internal temperature (in this case, approx. 111° C.) to the second internal temperature (in this case, approx. 113° C.), i.e. by approx. 2° C. As soon as this second internal temperature has been reached, the introduction of the solvent is stopped. The molded part is then vacuum-dried.

After the drying process is complete, the interior is cooled down (in this case, by approx. 2° C. to approx. 111° C.). This ensures that at the beginning of the next cycle the temperature difference between the temperature of the molded part and the temperature of the solvent is approximately the same as at the beginning of the previous cycle (at time t3).

After cooling the interior or the molded part, the solvent heated to 130° C. is added again at time t4. In contrast to the temperature profile shown in FIG. 5, the second internal temperature to be reached after time t4 can be higher in this second cycle (in this case, approx. 115° C.) than in the first cycle. The molded part is then vacuum-dried again and the internal temperature of the interior is lowered again (in this case, by around 2° C. to around 113° C.).

The third cycle is identical to the second cycle and is initiated at time t5 by adding the solvent heated to 130° C., whereby the second internal temperature rises to about 117° C.

The third cycle is completed at time t6 and the interior can be cooled to a specified temperature. The molded parts can then be removed from the pressure-tight container. However, this cooling process can also be dispensed with and the molded part can be removed directly after drying. In this case as well, the cooling process has the advantages mentioned with reference to FIG. 3.

Figure 7:
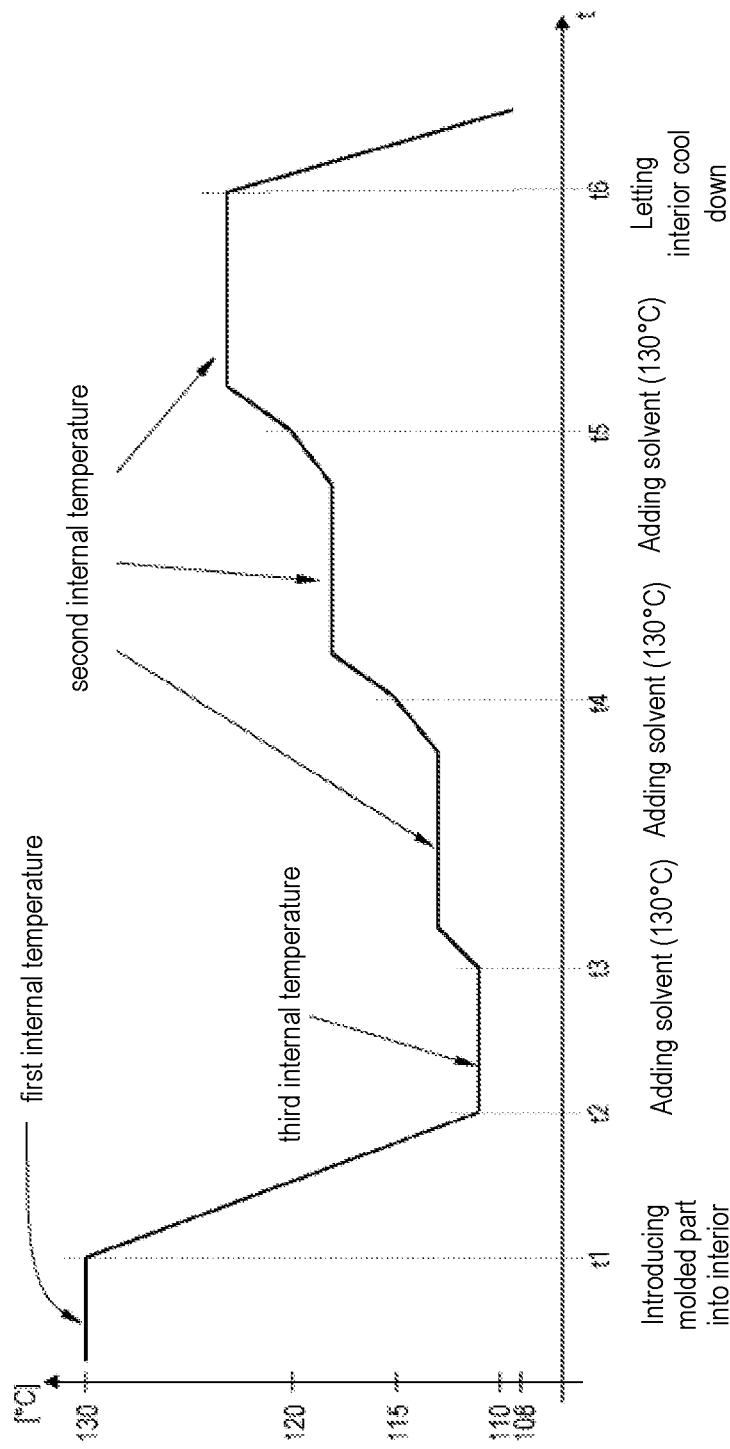
FIG. 7 is a fifth example of a temperature profile of the internal temperature of an interior of a surface processing device, a solvent being added to the interior three times.

FIG. 7 shows a temperature profile of the internal temperature of the interior, wherein the internal temperature of the interior, and thus the temperature of the molded part, is further heated after each cycle.

In this case, too, PP was used to manufacture the molded part. 1,2-diethylbenzene was used as the solvent. This isomer is particularly advantageous for sensitive applications, for example in the medical field, since there are no signs of respiratory toxicity compared to the isomer mixture and the other pure isomers.

First, the interior of the pressure-tight container is brought to a first internal temperature of about 130° C. At time t1, the molded part is placed into the interior and the interior is closed in a pressure-tight manner. A vacuum is then generated to a large extent in the interior. The temperature difference between the temperature of the molded part and the first internal temperature means that the first internal temperature drops to a third internal temperature by time t2 and the temperature of the molded part rises to this third internal temperature (in this case, approx. 111° C.).

After this third internal temperature has been reached, a solvent heated to 130° C. is added at time t3, which solvent evaporates suddenly in the interior or which already reaches the interior as solvent steam. The solvent steam condenses on the surface of the molded part and thereby effects the desired smoothing. By adding the solvent, the internal temperature of the interior and thus also the temperature of the molded part rise from the third internal temperature (in this case, approx. 111° C.) to the second internal temperature (in this case, approx. 113° C.), i.e. by approx. 2° C. As soon as this second internal temperature has been reached, the introduction of the solvent is stopped. The molded part is then vacuum-dried.

After the drying process is complete, the interior and thus the molded part is further heated (in this case, by approx. 2° C. to approx. 115° C.).

After heating the interior or the molded part, the solvent heated to 130° C. is added again at time t4. The second internal temperature rises by about 3° C. to about 118° C. The molded part is then vacuum-dried again and the internal temperature of the interior is further increased again (in this case, by around 2° C. to around 120° C.).

The third cycle is identical to the second cycle and is initiated at time t5 by adding the solvent heated to 130° C., whereby the second internal temperature rises to about 123° C.

The third cycle is completed at time t6 and the interior can be cooled to a specified temperature. The molded parts can then be removed from the pressure-tight container.

In the examples of a temperature profile shown with reference to FIGS. 3 to 7, three cycles (steaming of the surface and subsequent drying) were carried out in each case. Depending on the desired smoothness and depending on the material of the molded part and the solvent used, more than three or less than three cycles can also be carried out.

In the examples of a temperature profile shown with reference to FIGS. 3 to 7, the internal temperature of the pressure-tight container was first brought to a specified first internal temperature (in this case, 130° C.), before the (cold) molded part was introduced into the interior (at time t1).

As an alternative to this, however, the molded part can also be introduced into the "cold" interior and then the interior can be brought to the desired first internal temperature (for example to 130° C.). In the examples shown with reference to FIGS. 3 to 7, it would be sufficient in this case to bring the interior (including the cold molded part incorporated therein) to a first internal temperature at which a subsequent lowering to a third interior temperature is no longer necessary. For example, in the example shown in FIG. 3, the interior with the molded part arranged therein can be heated until a temperature of approximately 108° C. is reached. The solvent can then be added directly. It is advantageous in this case to heat the interior and thus the molded part under vacuum.

In the examples shown with reference to FIGS. 3 to 7, the same solvent was added in each cycle. Alternatively, in at least one cycle, a solvent can be added that is different from that of the other cycles. In the case of molded parts with particularly coarse-pored surfaces, for example, a solvent can be added in the first cycle that causes the surface to dissolve more quickly and/or more intensely. This also allows larger pores to be closed. A solvent can then be added in each of the following cycles, with which the surface is then only slightly and/or more slowly dissolved.

In the examples shown in FIGS. 3, 6 and 7, the second internal temperature rises successively with each cycle. In the example shown in FIG. 4, the second internal temperature remains constant over a plurality of cycles. In the example shown in FIG. 5, the second internal temperature drops successively with each cycle.

The temperature profiles shown in FIGS. 3 to 7 can also be combined. In other words, the method according to the invention can also be carried out in such a way that the second internal temperature rises or falls in two or more successive cycles and falls or rises in cycles following these cycles. The temperature profile can thus be optimally adapted to the surface smoothness to be achieved, depending on the materials of the molded parts and depending on the solvent used, in particular when different solvents are used in different cycles.

The experiments described above with reference to FIGS. 3 to 7 were repeated for
  PEEK as the material of the molded part and diethylbenzene as a solvent and
  PP as the material of the molded part and xylene as a solvent.

Example: PEEK as the Material of the Molded Part and Diethylbenzene as a Solvent An experiment was carried out with the temperature profile shown in FIG. 3. The result was a molded part with a surface that had no pores.

Example: PP as the Material of the Molded Part and Xylene as a Solvent

The temperatures of the temperature profiles shown in FIGS. 3 to 7 are between approximately 100° C. and 140° C. in this case. Specifically, a molded part made of PP with the temperature profile shown in FIG. 3 was carried out in an experiment, wherein the temperature at time t2 was about 100° C. and the second internal temperature was about 103° C. for the first cycle, about 109° C. for the second cycle and about 115° C. for the third cycle. The pressure in the interior of the pressure-tight container was set to below atmospheric pressure (specifically to about 200 hPa). This slight negative pressure is sufficient for the xylene to be able to evaporate in the interior at around 100° C.

Two experiments are described below.

Experiment 1

The molded parts are produced with the polyamide PA2200 according to a 3D printing method.

The interior 21 of the pressure-tight container is heated to a temperature of 135° C. (step S1, first interior temperature).

The molded parts are introduced into the interior 21 (step S2) and an extensive vacuum (approximately 7 mbar) is generated in the interior 21. By opening and closing the process chamber while introducing the molded parts into the interior, the interior cools down again somewhat (to about 125° C., 3rd interior temperature).

Solvent container is filled with diethylbenzene as solvent. Before or during steps S1 and S2, the solvent is heated to a temperature of about 135° C. (step S3), a pressure of 130 mbar being reached in the solvent container. Based on the steam pressure curve of diethylbenzene, this ensures that part of the solvent evaporates.

By opening the valve 50 for a duration of about 16 s and due to the pressure difference between the interior 21 and the solvent container 40, solvent flows into the interior 21 in step S4 and condenses on the molded parts, since these have a lower temperature than the inflowing solvent steam. The pressure in the solvent container 40 drops to about 100 mbar, while the pressure in the interior 21 rises to about 80 mbar. At the same time, the temperature in the interior 21 increases to about 126° C. (2nd interior temperature).

The solvent is then suctioned off from the interior 21 (step S4.1) and the molded part is dried in a vacuum (step S5). In the process, the temperature in the interior 21 drops to a temperature below the 2nd interior temperature (<126° C.) as a result of the evaporation of the solvent, whereby temperature can also drop below the 3rd interior temperature (<125° C.). This ensures that the temperature of the solvent steam is always above the temperature of the interior 21 and thus also above the temperature of the molded parts to be smoothed. This ensures that solvents condense on the surface of the molded parts and that these are further smoothed in the subsequent vaporization cycles.

Steps S4, S4.1 and S5 are then repeated 18 times before the component is finally dried.

Experiment 2

The molded parts are made from PEEK according to a 3D printing method.

The interior 21 of the pressure-tight container is heated to a temperature of approximately 135° C. (step S1, first interior temperature).

The molded parts are introduced into the interior 21 (step S2) and an extensive vacuum (approximately 8 mbar) is generated in the interior 21. By opening and closing the process chamber 20, the interior 21 cools down again somewhat in this process step.

The molded parts then remain in the preheated, evacuated chamber for 30 minutes. This has the advantage that the molded parts are gently heated and the thermal stress that is triggered when the hot solvent steam flows in can be reduced to a minimum. At the same time, this allows any water that may be bound in the material to escape gently and reduces the amount of condensed solvent during subsequent steaming. This does not prevent the formation of bubbles caused by overcooking the surface. After this time, the interior 21 is at a temperature of 105° C. (3rd interior temperature).

The solvent container 40 is filled with diethylbenzene as a solvent. Before or during steps S1 and S2, the solvent is heated to a temperature of about 135° C. (step S3), a pressure of about 120 mbar being reached in the interior 70. Based on the steam pressure curve of diethylbenzene, this ensures that part of the solvent evaporates.

By opening the valve 50 for a period of about 25 s and due to the pressure difference between the interior 21 and the interior 70, solvent flows into the interior 21 in step S4 and condenses on the molded parts since these have a lower temperature than the inflowing solvent steam. The pressure in the solvent container 40 drops to about 90 mbar, while the pressure in the interior 21 rises to about 70 mbar. At the same time, the temperature in the interior 21 increases to about 110° C. (2nd interior temperature).

The solvent is then suctioned off (step S4.1) and the component is dried in a vacuum (step S5). In the process, the temperature in the interior 21 drops to a temperature below the 2nd interior temperature (<110° C.) as a result of the evaporation of the solvent.

The temperature in the interior 21 is then reduced, which can be achieved, for example, by briefly opening the container 20 followed by closing the container 20 again and evacuating the interior 21. This means that a temperature below the 2nd interior temperature, preferably exactly the 3rd interior temperature, is reached.

Steps S4, S4.1 and S5 are then repeated twice before the component is finally dried.

Experiment 3

The molded parts are produced with polypropylene according to a 3D printing method.

The interior 21 of the pressure-tight container is heated to a temperature of 125° C. (step S1).

The molded parts are introduced into the interior 21 (step S2) and an extensive vacuum (approximately 7 mbar) is generated in the interior 21. By opening and closing the process chamber while introducing the molded parts into the interior, the interior cools down again somewhat (to about 115° C.).

The solvent container is filled with 1,8-cineole as the solvent. Before or during steps S1 and S2, the solvent is heated to a temperature of about 130° C. (step S3), a pressure of 250 mbar being reached in the solvent container. Based on the steam pressure curve of limonene, this ensures that part of the solvent evaporates.

By opening the valve 50 for a duration of about 12 s and due to the pressure difference between the interior 21 and the solvent container 40, solvent flows into the interior 21 in step S4 and condenses on the molded parts, since these have a lower temperature than the inflowing solvent steam. The pressure in the solvent container 40 drops to about 100 mbar, while the pressure in the interior 21 rises to about 85 mbar. At the same time, the temperature in the interior 21 increases to about 116° C.

After about 12 s, the valve 50 is closed in order to stop the solvent supply into the interior 21. The molded part then remains in the interior 21 for about 15 s (holding time, step S4a). In an alternative embodiment of the invention, however, this holding time can also be dispensed with.

The solvent is then suctioned off from the interior 21 (step S4.1) and the molded part is dried in a vacuum (step S5). In the process, the temperature in the interior 21 drops to a temperature below 116° C. as a result of the evaporation of the solvent. This ensures that the temperature of the solvent steam is always above the temperature of the interior 21 and thus also above the temperature of the molded parts to be smoothed. This ensures that solvents condense on the surface of the molded parts and that these are further smoothed in the subsequent vaporization cycles.

Steps S4, S4.1 and S5 are then repeated 16 times before the component is finally dried.

Experiment 4

The molded parts are produced with a thermoplastic polyurethane (TPU) according to a 3D printing method.

The interior 21 of the pressure-tight container is heated to a temperature of approximately 130° C. (step S1).

The molded parts are introduced into the interior 21 (step S2) and an extensive vacuum (approximately 8 mbar) is generated in the interior 21. By opening and closing the process chamber 20, the interior 21 cools down again somewhat in this process step.

The molded parts then remain in the preheated, evacuated chamber for 5 minutes. This has the advantage that the molded parts are gently heated and the thermal stress that is triggered when the hot solvent steam flows in can be reduced to a minimum. At the same time, this allows any water that may be bound in the material to escape gently and reduces the amount of condensed solvent during subsequent steaming. This can prevent the formation of bubbles caused by overcooking the surface. After this time, the interior 21 is cooled to a temperature of 115° C.

The solvent container 40 is filled with ethyl lactate as a solvent. Before or during steps S1 and S2, the solvent is heated to a temperature of about 130° C. (step S3), a pressure of about 170 mbar being reached in the interior 70. Based on the steam pressure curve of ethyl lactate, this ensures that part of the solvent evaporates.

By opening the valve 50 for a duration of about 25 s and due to the pressure difference between the interior 21 and the interior 70, solvent flows into the interior 21 in step S4 and condenses on the molded parts since these have a lower temperature than the inflowing solvent steam. The pressure in the solvent container 40 drops to about 90 mbar, while the pressure in the interior 21 rises to about 70 mbar. At the same time, the temperature in the interior 21 increases to about 120° C.

After a holding time (step S4a) of about 12 s (the holding time is optional), the solvent is suctioned off (step S4.1) and the component is dried in vacuum (step S5). In the process, the temperature in the interior 21 drops to a temperature below 120° C. as a result of the evaporation of the solvent. After drying, the molded part can remain in the interior 21 for a holding time (step S5a) of approximately 30 s before it is removed from the interior 21 or the method is continued with step S4. In this case too, in an alternative embodiment of the invention, the holding time (step S5a) can be dispensed with.

Steps S4, S4.1 and S5 are then repeated twice before the component is finally dried.

Experiment 5

150 ml of D-limonene were heated to 130° C. in a 250 ml beaker while stirring. A 3D-printed polypropylene molded part having a melting point of 140° C. was attached to a wire and completely immersed in the hot solvent for 1 second (immersion method). After a drying time of 10 s at room temperature, the process was repeated a total of five times. The component was then dried with a hot air gun at 100° C. The result is a smooth and sealed surface of the component.

Experiment 6

The molded parts are produced with polypropylene according to a 3D printing method.

The interior 21 of the pressure-tight container is heated to a temperature of 125° C. (step S1).

The molded parts are introduced into the interior 21 (step S2) and an extensive vacuum (approximately 10 mbar) is generated in the interior 21. By opening and closing the process chamber while introducing the molded parts into the interior, the interior cools down again somewhat (to about 115° C.).

In another embodiment, the temperature of the process chamber can also be kept at a constant temperature of 125° C.

The components are kept in the evacuated interior (100 mbar) for 30 minutes, during which the components heat up to around 95° C.

The solvent container is filled with pure 1,8-cineole (eucalyptol) from natural sources as a solvent. Before or during steps S1 and S2, the bio-based solvent is heated to a temperature of about 125° C. (step S3), a pressure of 230 mbar being reached in the solvent container. Based on the steam pressure curve of 1,8-cineole, this ensures that part of the solvent evaporates. The heat output is 13.2 kW and is brought in via a water jacket heater.

By opening the valve 50 for a duration of about 35 s and due to the pressure difference between the interior 21 and the solvent container 40, solvent flows into the interior 21 in step S4 and condenses on the molded parts, since these have a lower temperature than the inflowing solvent steam. The pressure in the solvent container 40 drops to about 210 mbar, while the pressure in the interior 21 rises to about 200 mbar. At the same time, the temperature in the interior 21 increases.

After 35 s, the valve 50 is closed to stop the supply of solvent steam into the interior 21. In one embodiment of the invention, the molded part can then remain in the solvent steam in the interior 21 for about 10 s (holding time, step S4*a*).

The solvent is then suctioned off from the interior 21 (step S4.1) by the vacuum and the molded part is dried in a vacuum (step S5). This happens at about 10 mbar for about 120 s. The temperature in the interior 21 falls due to the evaporation of the solvent to a temperature below the solvent steam in the solvent container 40. This ensures that the temperature of the solvent steam is always above the temperature of the interior 21 and above the temperature of the molded parts to be smoothed. This ensures that solvents condense on the surface of the molded parts and that these are further smoothed in the subsequent vaporization cycles.

Steps S4, S4.1 and S5 are then repeated 20 times before the component is finally dried.

In a further experiment, steps S4, S4.1 and S5 were repeated 25 times.

The peak temperature of the components after the last evaporation step is around 120° C.

Figure 8:
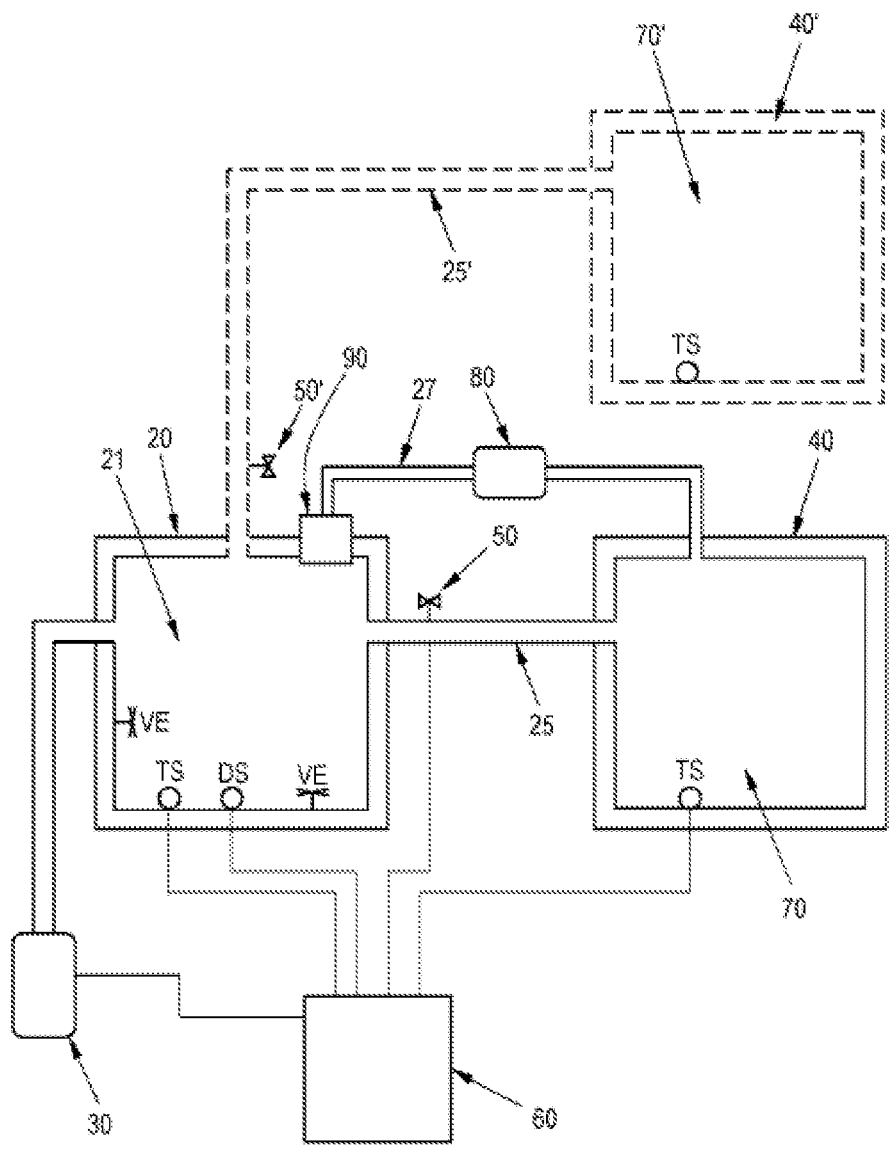
FIG. 8 is a schematic representation of a device according to the invention for treating the surface of at least one molded part produced in a 3D printing method.

FIG. 8 schematically shows a device according to the invention for treating a surface of at least one molded part produced according to a 3D printing method.

The device substantially comprises a pressure-tight container 20 into the interior 21 of which the molded part to be treated is introduced. The pressure-tight container 20 is designed so that a negative pressure, in particular a vacuum to a large extent, can be generated in the interior 21.

The device further comprises a solvent container 40 for storing the solvent 70 to be introduced into the interior 21. The solvent container 40 can also be designed to be pressure-tight, in particular in such a way that a negative pressure can be generated in the interior 70.

The solvent container 40 and the pressure-tight container 20 are connected to one another via a supply line 25, wherein a valve 50 can be arranged in the supply line with which the supply of solvent from the solvent container 40 into the interior 21 of the container 20 can be controlled.

The pressure-tight container 20 and the solvent container 40 are each designed such that, on the one hand, the interior 21 of the pressure-tight container 20 and, on the other hand, the solvent 70 in the solvent container 40 can each be heated to a specified temperature. For this purpose, for example, heating jackets or jacket heaters (not shown in FIG. 8) can be arranged on the respective container 20, 40. Other heating devices are possible.

Corresponding temperature sensors TS, which are coupled to an open or closed loop controller 60, can be provided to control the temperatures in the interior and of the solvent. The open or closed loop controller 60 can control the supply of heat energy for heating the interior 21 or for heating the solvent 70 as a function of the measured temperature values.

Furthermore, the pressure-tight container 20 can have a pressure sensor DS with which the pressure conditions in the interior 21 can be monitored. This pressure sensor DS is also coupled to the open or closed loop controller 60.

The open or closed loop controller 60 can also control a vacuum pump 30 with which a negative pressure or a vacuum can be generated in the interior 21 of the pressure-tight container 20.

In addition, the open or closed loop controller 60 is coupled to the valve 50, so that the open or closed loop controller 60 can control the valve 50 as a function of the temperature in the interior 21.

The interior 21 of the pressure-tight container 20 can be assigned a turbulence device VE, which is designed here as a fan. With the help of the turbulence device VE, it is possible to ensure that the solvent steam condenses evenly over the entire surface of the molded part, including on hidden or internal surface regions, without droplets forming. In one embodiment, a plurality of turbulence devices VE can also be provided.

In a special embodiment of the device according to the invention, it can have one or more further solvent containers 40', which are each connected to the pressure-tight container 20 via a supply line 25' and which can also be designed to be pressure-tight. The supply lines 25' can each have a valve 50' with which the supply of solvent from the respective solvent container 40' into the interior 21 of the container 20 can be controlled.

Furthermore, the solvent containers 40, 40' can each have a pressure sensor DS (not shown in FIG. 8), with which the pressure conditions in each interior 70, 70' can be monitored. These pressure sensors DS are also coupled to the open or closed loop controller 60.

A different solvent can be stored in each of the solvent containers 40, 40', which is particularly advantageous if a different solvent is to be used for one cycle than for the other cycles.

However, the same solvent can also be stored in the solvent containers 40, 40'. This is advantageous, for example, when this solvent is to be supplied to the interior 21 in two different cycles at a different temperature. The solvent in the solvent container 40 can thus be heated to a different temperature than the solvent stored in the solvent container 40'.

It is particularly advantageous if the pressure-tight container 21 is coupled to a suction device 90, which in turn is coupled to the solvent container 40 via a return line 27. The suction device 90 is adapted to suction off the solvent steam present in the interior 21 and/or the solvent condensate present on the inner walls of the interior and feed it back to the solvent container 40 via the return line 27. The solvent can thus be optimally used, which on the one hand lowers the costs for the smoothing according to the invention and on the other hand protects the environment.

The suctioned-off solvent steam or the suctioned-off solvent condensate can be processed before being supplied to the solvent container 40, in particular cleaned and/or distilled. For this purpose, a cleaning and/or distilling device 80 can be provided in the return line 27. The distillation of the suctioned-off solvent steam or the suctioned-off solvent condensate has proven to be particularly advantageous, so that it is particularly advantageous according to the invention to use distillable solvent.

Corresponding return lines with corresponding cleaning and/or distilling devices, which are not shown in FIG. 8, can likewise be provided for the further solvent containers 40'.

Figure 9:
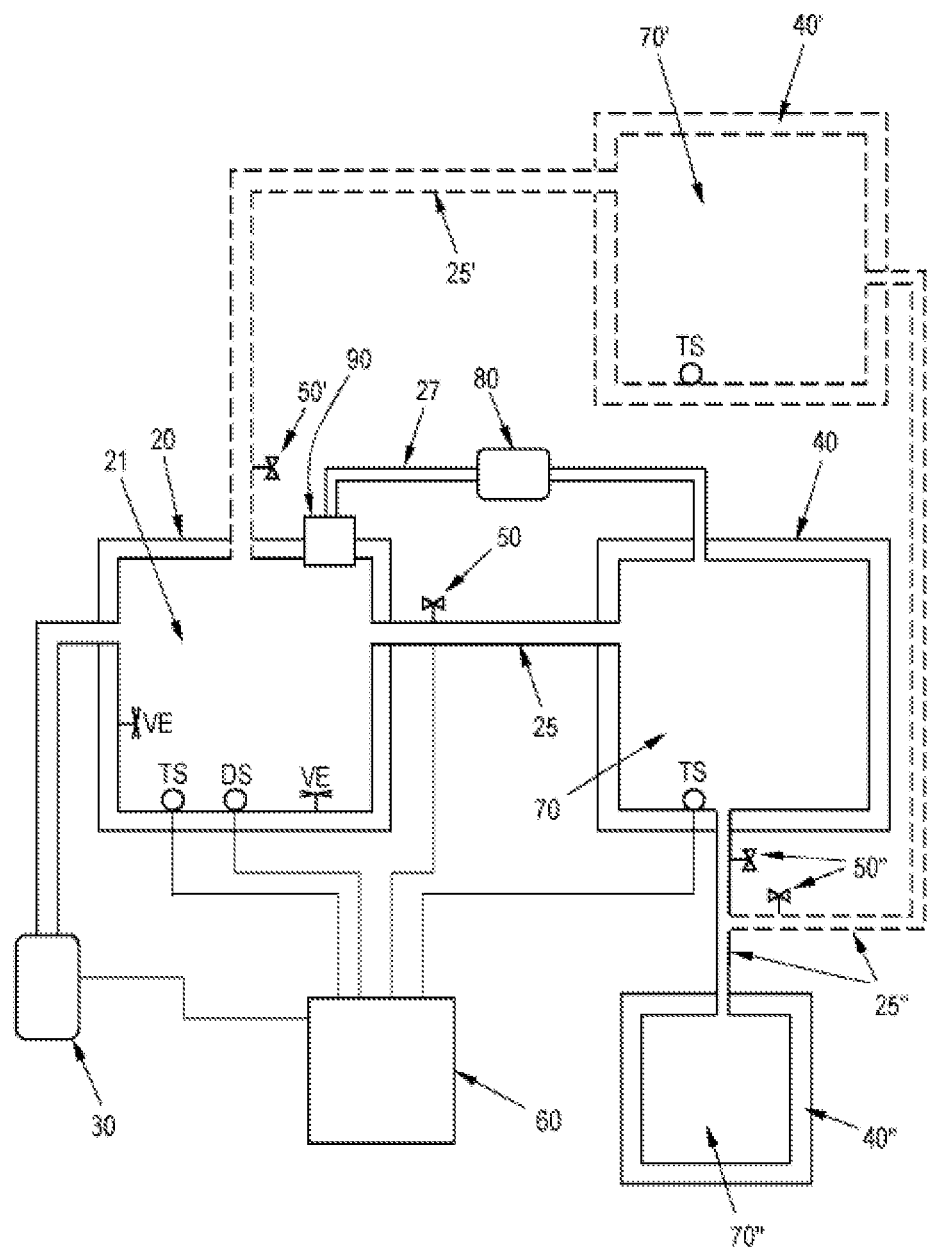
FIG. 9 is a schematic representation of a further embodiment of a device according to the invention for treating the surface of at least one molded part produced in a 3D printing method.

FIG. 9 schematically shows a further embodiment of a device according to the invention for treating the surface of at least one molded part produced in a 3D printing method.

The device substantially comprises a pressure-tight container 20 into the interior 21 of which the molded part to be treated is introduced. The pressure-tight container 20 is designed so that a negative pressure, in particular an extensive vacuum, can be generated in the interior 21.

The device further comprises a solvent container 40 for storing a bio-based solvent 70 to be introduced into the interior 21. The solvent container 40 can also be designed to be pressure-tight, in particular in such a way that a negative pressure can be generated in the interior 70.

The solvent container 40 and the pressure-tight container 20 are connected to one another via a supply line 25, wherein a valve 50 can be arranged in the supply line with which the supply of solvent from the solvent container 40 into the interior 21 of the container 20 can be controlled.

The pressure-tight container 20 and the solvent container 40 are each designed such that, on the one hand, the interior 21 of the pressure-tight container 20 and, on the other hand, the solvent 70 in the solvent container 40 can each be heated to a specified temperature. For this purpose, for example, heating jackets or jacket heaters (not shown in FIG. 9) can be arranged on the corresponding container 20, 40. Other heating devices are possible.

Corresponding temperature sensors TS, which are coupled to an open or closed loop controller 60, can be provided to control the temperatures in the interior 21 and of the solvent 70. The open or closed loop controller 60 can control the supply of heat energy for heating the interior 21 or for heating the solvent 70 as a function of the measured temperature values.

Furthermore, the pressure-tight container 20 can have a pressure sensor DS with which the pressure conditions in the interior 21 can be monitored. This pressure sensor DS is also coupled to the open or closed loop controller 60.

The open or closed loop controller 60 can also control a vacuum pump 30 with which a negative pressure or a vacuum can be generated in the interior 21 of the pressure-tight container 20. The vacuum pump 30 can also be used to generate a negative pressure or an extensive vacuum in the interior 70 of the solvent container 40.

In addition, the open or closed loop controller 60 is coupled to the valve 50, so that the open or closed loop controller 60 can control the valve 50 as a function of the temperature and/or pressure in the interior 21.

The interior 21 of the pressure-tight container 20 can be assigned a turbulence device VE, which is designed here as a fan. With the help of the turbulence device VE, it is possible to ensure that the solvent steam condenses evenly over the entire surface of the molded part, including on hidden or internal surface regions, without droplets forming. In one embodiment, a plurality of turbulence devices VE can also be provided.

In a special embodiment of the device according to the invention, it can have one or more further solvent containers 40', which are each connected to the pressure-tight container 20 via a supply line 25' and which can also be designed to be pressure-tight. The supply lines 25' can each have a valve 50' with which the supply of solvent from the respective solvent container 40' into the interior 21 of the container 20 can be preferably controlled using the open or closed loop controller 60. The additional solvent containers 40' can also be coupled to the vacuum pump 30 in order to generate a negative pressure or an extensive vacuum in the interior 70' of the respective additional solvent container 40'.

In one embodiment of the invention, the solvent containers 40, 40' can be coupled to a further, second solvent container 40". A mixture of bio-based solvent and additives or only additives can be stored in the second solvent container 40". The addition of this mixture or the additives to the solvent container 40, 40' can be controlled via a valve 50". This has the advantage that additives in the solvent containers 40, 40' that have been used up over time can be replenished and thus the stability of the bio-based solvent in the solvent containers 40, 40' can be ensured for even longer.

Furthermore, the solvent containers 40, 40', 40" can each have a pressure sensor DS (not shown in FIG. 9), with which the pressure conditions in each interior 70, 70', 70" can be monitored. These pressure sensors DS are also coupled to the open or closed loop controller 60.

A different solvent can be stored in each of the solvent containers 40, 40', which is particularly advantageous if a different solvent is to be used for one cycle than for the other cycles.

However, the same solvent can also be stored in the solvent containers 40, 40'. This is advantageous, for example, when this solvent is to be supplied to the interior 21 in two different cycles at a different temperature. The solvent in the solvent container 40 can thus be heated to a different temperature than the solvent stored in the solvent container 40'.

It is particularly advantageous if the pressure-tight container 21 is coupled to a suction device 90, which in turn is coupled to the solvent container 40 or to the solvent container 40' via a return line 27. The suction device 90 is adapted to suction off the solvent steam present in the interior 21 and/or the solvent condensate present on the inner walls of the interior and feed it back to the solvent container 40 via the return line 27. The solvent can thus be optimally used, which on the one hand lowers the costs for the smoothing according to the invention and on the other hand protects the environment.

The suctioned-off solvent steam or the suctioned-off solvent condensate can be processed before being supplied to the solvent container 40, 40', in particular cleaned and/or distilled. For this purpose, a cleaning and/or distilling device 80 can be provided in the return line 27. The distillation of the suctioned-off solvent steam or the suctioned-off solvent condensate has proven to be particularly advantageous, so that it is particularly advantageous according to the invention to use distillable solvent.

Corresponding return lines with corresponding cleaning and/or distilling devices, which are not shown in FIG. 9, can likewise be provided for the further solvent containers 40'.

The method according to the invention and the device according to the invention for carrying out the method have the advantage that the surfaces of the molded parts can be smoothed in a particularly time-efficient manner, so that the method is also suitable for surface smoothing on an industrial scale. The steaming in the respective cycle only takes a few seconds since this period is sufficient to allow sufficient solvent steam to flow into the interior of the pressure-tight container with which the desired smoothing effect is achieved in one cycle. The vacuum-drying also takes only a few seconds, in particular if the solvent steam still present in the interior and the solvent condensate formed on the interior walls and on the bottom of the interior are suctioned off. A cycle can thus be carried out within a few seconds to minutes.

In addition, the method according to the invention is also particularly suitable for flexible molded parts, the surfaces of which cannot be mechanically smoothed or only with considerable effort. Particularly advantageous is the inventive method for thermoplastic polymers (TPE), which is based on olefins (TPO), such as a PP/EPDM copolymer blend.

Experiments have shown that with the method according to the invention, smoothed surfaces can be produced which practically do not differ from surfaces of molded parts which have been produced by injection molding.

A substantial advantage of the invention, however, is that the smoothing according to the invention results in the molded parts having a highly homogeneous surface, which is particularly advantageous when the molded parts are then colored. The homogeneous surface of the molded parts achieved by the method according to the invention means that colors are absorbed equally well over the entire surface, so that a homogeneous color image results. In particular, staining is effectively prevented.

REFERENCE SIGNS

10 Molded part
11 Surface of the molded part 10
20 Pressure-tight container
21 Interior of the pressure-tight container 20
25, 25', 25" Supply line
27 Return line
30 Vacuum pump
40, 40' Solvent container, preferably pressure-tight
50, 50', 50" Valve
60 Open or closed loop controller
70, 70', 70" Solvent or interior of the solvent container 40, 40', 40"
80 Cleaning/distilling device
90 Suction device
DS Pressure sensor
H Holding time
S1-S6 Steps of the method
T Drying
TS Temperature sensor
VE Turbulence device

The invention claimed is:

1. Method for treating a surface (11) of a molded part (10) produced according to a 3D printing method using a plastics material, wherein a solvent selected from the group consisting of bio-based solvents is applied to the surface (11) of the molded part (10), wherein the bio-based solvent is 1,8-Cineole.

2. Method according to claim 1, wherein the solvent is applied in vaporous form to the surface (11) of the molded part (10).

3. Method according to claim 1, wherein the bio-based solvent is applied to the surface (11) of the molded part (10) in a low-oxygen atmosphere.

4. Method according to claim 1, wherein at least one additive is added to the bio-based solvent before it is applied to the surface (11) of the molded part (10).

5. Method according to claim 4, wherein the additive is selected from the group consisting of:
   antioxidants,
   heat stabilizers,
   polymerization inhibitors and
   combinations or mixtures thereof.

6. Method according to claim 4, wherein the additive is selected from the group consisting of:
   sterically hindered phenolic compounds,
   sterically hindered amines (HALS),
   phosphites,
   phosphonites and
   combinations or mixtures thereof.

7. Method according to claim 4, wherein the at least one additive is added to the bio-based solvent at a concentration of between 5 ppm and 4000 ppm based on the bio-based solvent.

8. Method according to claim 4, wherein the at least one additive has a boiling point and a decomposition temperature that is above the boiling point of the bio-based solvent.

9. Method according to claim 1, wherein the plastics material is selected
   from the group consisting of thermoplastics and light-curing plastics materials.

10. Method according to claim 1, wherein
    (a) the molded part (10) is introduced into an interior (21) of a pressure-tight container (20),
    (b) a negative pressure is generated in the interior (21) of the container after introducing the molded part (10) into the container (20),
    (c) the solvent is heated up to a specified solvent temperature and
    (d) the heated solvent is introduced from a solvent container (40) into the interior (21) under negative pressure after introducing the molded part (10) into the interior (21) of the container (20),
    wherein
    the temperature of the molded part (10) is lower than the solvent temperature and
    the solvent is evaporated into the interior (21) or is introduced as a steam into the interior (21) upon being introduced, said solvent steam condensing on the surface of the molded part (10).

11. Method according to claim 10, wherein the interior (21) of the pressure-tight container (20) is brought to a specified first internal temperature before step (a) or after step (a).

12. Method according to claim 3, wherein by introducing the solvent into the interior (21) (step (d)), the temperature of the interior is brought to a specified second internal temperature, wherein the solvent is introduced into the interior:
    until the specified second internal temperature is reached as long as the solvent is introduced into the interior or
    over a specified period of time, wherein the specified second internal temperature is reached after the specified period of time.

13. Method according to claim 12, wherein the temperature of the interior is brought to a third internal temperature after introducing the molded part (10) into the interior (21) (step (a)) and before introducing the solvent into the interior (21) (step (d)), wherein the third internal temperature is lower than the specified second internal temperature, whereby the molded part is brought to a part temperature which is lower than the specified second internal temperature.

14. Method according to claim 10, wherein a negative pressure is generated in the interior of the solvent container (40) before introducing the solvent from the solvent container (40) into the interior (21) of the pressure-tight container (20), wherein the pressure in the interior (21) of the pressure-tight container (20) is lower than the pressure in the interior of the solvent container (40).

15. Method according to claim 14, wherein the pressure difference between the interior (21) of the pressure-tight container (20) and the interior of the solvent container (40) is selected so that a turbulence in the solvent introduced into the interior (21) of the pressure-tight container (20) is caused due to the pressure difference.

16. Method according to claim 10, wherein
(e) after the introduction of the solvent into the interior, the molded part is dried.

17. Method according to claim 16, wherein steps (d) and (e) are repeated a number of times.

18. Method according to claim 17, wherein a negative pressure is generated to dry the molded part in the interior (21), wherein the generation of the negative pressure is interrupted at least once in that a transport gas is supplied into the interior (21), wherein the transport gas is supplied to the interior (21) when the pressure in the interior (21) is less than 50 mbar, the pressure in the interior (21) being increased to a value of between 50 mbar and 100 mbar by supplying the transport gas.

19. Method according to claim 16, wherein steps (d) and (e) are repeated multiple times, wherein during one repetition
in step (d), the temperature of the interior is brought to a second internal temperature which is higher than the second internal temperature in the previous execution of step (d) or
in step (d), the temperature of the interior is brought to a second internal temperature which is lower than the second internal temperature in the previous execution of step (d) or
in step (d), the temperature of the interior is brought to a second internal temperature which is to a large extent equal to the second internal temperature in the previous execution of step (d).

20. Method according to claim 19, wherein during a repetition and prior to carrying out step (d) the temperature of the interior is brought to a temperature which is lower or higher than the second internal temperature in the previous execution of step (d).

21. Method according to claim 19, wherein the temperature of the solvent is reduced after each repetition.

22. Method according to claim 16, wherein
after step (d), a holding time (H) is provided during which the molded part is located in the interior (21) of the pressure-tight container (20) in an environment that occurs immediately after the introduction of the solvent or the solvent steam into the interior of the pressure-tight container and/or
after step (e), a holding time (H) is provided during which the molded part is located in the interior (21) of the pressure-tight container (20) in an environment that occurs immediately after the drying or immediately after the suctioning off of the solvent or the solvent steam from the interior of the pressure-tight container.

23. Method according to claim 10, wherein, after step (d), the solvent evaporated in the interior space (21) and/or the solvent condensed on the inner wall of the interior space (21) are suctioned off, wherein the suctioned-off solvent is processed, and the processed solvent is returned to the solvent container (40).

24. Method according to claim 10, wherein the negative pressure in the interior, the solvent temperature, and a temperature within the interior of the container are coordinated so that the solvent evaporates in the interior upon being introduced into the interior or enters the interior as solvent steam.

25. Method according to claim 10, wherein a turbulence in the solvent steam introduced into the interior (21) is caused in the interior.

26. Method according to claim 10, wherein the molded part is heated before step (a).

27. Method according to claim 10, wherein a plurality of liters of solvent are heated to the specified solvent temperature.

28. Method according to claim 10, wherein the solvent is heated to the specified solvent temperature, which is above 50° C.

* * * * *